United States Patent
Sommer et al.

(10) Patent No.: US 12,361,651 B2
(45) Date of Patent: Jul. 15, 2025

(54) PRESENTING COMMUNICATION DATA BASED ON ENVIRONMENT

(71) Applicant: Apple Inc., Cupertino, CA (US)

(72) Inventors: Bruno M. Sommer, Sunnyvale, CA (US); Leanid Vouk, San Carlos, CA (US); Luis Rafael Deliz Centeno, Fremont, CA (US)

(73) Assignee: APPLE INC., Cupertino, CA (US)

( * ) Notice: Subject to any disclaimer, the term of this patent is extended or adjusted under 35 U.S.C. 154(b) by 97 days.

(21) Appl. No.: 18/112,461

(22) Filed: Feb. 21, 2023

(65) Prior Publication Data

US 2023/0334794 A1    Oct. 19, 2023

Related U.S. Application Data

(63) Continuation of application No. 17/860,393, filed on Jul. 8, 2022, now abandoned, which is a continuation
(Continued)

(51) Int. Cl.
*G06T 19/00* (2011.01)
*G06F 3/01* (2006.01)
(Continued)

(52) U.S. Cl.
CPC ........... *G06T 19/006* (2013.01); *G06F 3/011* (2013.01); *G06F 3/16* (2013.01); *G06T 11/00* (2013.01);
(Continued)

(58) Field of Classification Search
None
See application file for complete search history.

(56) References Cited

U.S. PATENT DOCUMENTS

| | | | |
|---|---|---|---|
| 9,686,466 B1 | 6/2017 | Billinghurst et al. | |
| 11,995,776 B2 * | 5/2024 | Evangelista | G06V 20/20 |

(Continued)

FOREIGN PATENT DOCUMENTS

| | | |
|---|---|---|
| JP | 2018018558 A | 2/2018 |
| KR | 20070041681 A | 4/2007 |

(Continued)

OTHER PUBLICATIONS

Christoph Kirsch et al, "Spatial Resolution of Late Reverberation in Virtual Acoustic Environments", 2021, Trends Hear 25: 23312165211054924, doi: 10.1177/23312165211054924 (Year: 2021).*

(Continued)

*Primary Examiner* — Michael J Cobb
(74) *Attorney, Agent, or Firm* — Fernando & Partners, LLP

(57) ABSTRACT

Various implementations disclosed herein include devices, systems, and methods for presenting communication data. In various implementations, a first device associated with a first person includes a display, a non-transitory memory and one or more processors coupled with the display and the non-transitory memory. In some implementations, a method includes obtaining communication data associated with a second device corresponding to a second person. In some implementations, the method includes determining whether the first device and the second device are in a shared environment. In some implementations, the method includes in response to determining that the first device and the second device are not in a shared environment, displaying a representation of the second person based on the communication data associated with the second device.

20 Claims, 15 Drawing Sheets

Related U.S. Application Data of application No. 17/536,680, filed on Nov. 29, 2021, now abandoned, which is a continuation of application No. PCT/US2020/034771, filed on May 28, 2020.

(60) Provisional application No. 62/855,155, filed on May 31, 2019.

(51) Int. Cl.
*G06F 3/16* (2006.01)
*G06T 11/00* (2006.01)
*G06T 15/00* (2011.01)
*H04R 5/02* (2006.01)
*H04S 7/00* (2006.01)

(52) U.S. Cl.
CPC .............. *G06T 15/00* (2013.01); *H04R 5/02* (2013.01); *H04S 7/302* (2013.01); *H04S 7/305* (2013.01); *G06T 2200/24* (2013.01); *H04S 2400/11* (2013.01)

(56) References Cited

U.S. PATENT DOCUMENTS

| | | | | |
|---|---|---|---|---|
| 2007/0279483 A1* | 12/2007 | Beers | ................... | H04L 65/765 |
| | | | | 348/E7.083 |
| 2007/0279484 A1* | 12/2007 | Derocher | ................ | H04N 7/15 |
| | | | | 348/E7.083 |
| 2013/0141456 A1 | 6/2013 | Sokolov et al. | | |
| 2014/0058812 A1* | 2/2014 | Bender | .............. | G06Q 30/0267 |
| | | | | 705/14.12 |
| 2015/0215351 A1* | 7/2015 | Barzuza | ................ | H04N 7/157 |
| | | | | 715/757 |
| 2017/0038829 A1* | 2/2017 | Lanier | ................... | G06T 19/006 |
| 2017/0243403 A1 | 8/2017 | Daniels et al. | | |
| 2017/0326457 A1 | 11/2017 | Tilton et al. | | |
| 2018/0243650 A1* | 8/2018 | Baszucki | .............. | A63F 13/355 |
| 2018/0314486 A1* | 11/2018 | Edry | ....................... | G09G 5/006 |
| 2018/0332420 A1* | 11/2018 | Salume | ................... | H04S 3/002 |
| 2018/0341618 A1 | 11/2018 | Yuan | | |
| 2019/0005042 A1* | 1/2019 | Pushparaja | ............. | G06F 3/011 |
| 2019/0088016 A1* | 3/2019 | Tadros | .................. | G06T 19/003 |
| 2019/0108578 A1* | 4/2019 | Spivack | ................. | G09B 5/065 |
| 2019/0150875 A1 | 5/2019 | Kagermeier et al. | | |
| 2019/0324538 A1* | 10/2019 | Rihn | ....................... | G06F 3/014 |
| 2019/0356999 A1* | 11/2019 | Raghuvanshi | .......... | H04S 7/304 |
| 2020/0097155 A1* | 3/2020 | Murto | .................... | A63F 13/217 |
| 2020/0265228 A1* | 8/2020 | Petluru | .................. | G06V 20/20 |
| 2024/0112412 A1* | 4/2024 | Wanbo | .................... | G06T 19/20 |
| 2024/0112413 A1* | 4/2024 | Wanbo | .................. | G06T 19/006 |

FOREIGN PATENT DOCUMENTS

| | | |
|---|---|---|
| WO | 2018155052 A1 | 8/2018 |
| WO | 2019067780 A1 | 4/2019 |

OTHER PUBLICATIONS

Practical Music, "The Difference Between Reverb and Echo | Sonic FX Defined", 2024, pp. 1-16, retrieved from "https://www.practical-music-production.com/difference-between-reverb-and-echo/" (Year: 2024).*

PCT International Search Report and Written Opinion dated Aug. 25, 2020, International Application No. PCT/US2020/034771, pp. 1-10.

Office Action for corresponding Japanese Appl. No. 2021-564638 dated Dec. 12, 2022.

Notice of Preliminary Rejection dated Feb. 28, 2024, Korean Patent Application No. 10-2021-7038239, pp. 1-11.

Office Action for corresponding Japanese Appl. No. 2021-564638 dated Jun. 29, 2023.

* cited by examiner

PRESENTING COMMUNICATION DATA BASED ON ENVIRONMENT

CROSS-REFERENCE TO RELATED APPLICATION

This application is a continuation of U.S. patent application Ser. No. 17/860,393, filed on Jul. 8, 2022, which is a continuation of U.S. patent application Ser. No. 17/536,680, filed on Nov. 29, 2021, which is a continuation of Intl. Patent App. No. PCT/US2020/034771, filed on May 28, 2020, which claims priority to U.S. Provisional Patent App. No. 62/855,155, filed on May 31, 2019, which are hereby incorporated by reference in their entirety.

TECHNICAL FIELD

The present disclosure generally relates to presenting communication data based on environment.

BACKGROUND

Some devices are capable of generating and presenting environments. Some devices that present environments include mobile communication devices such as smartphones. Most previously available devices that present environments are ineffective at presenting communication data.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
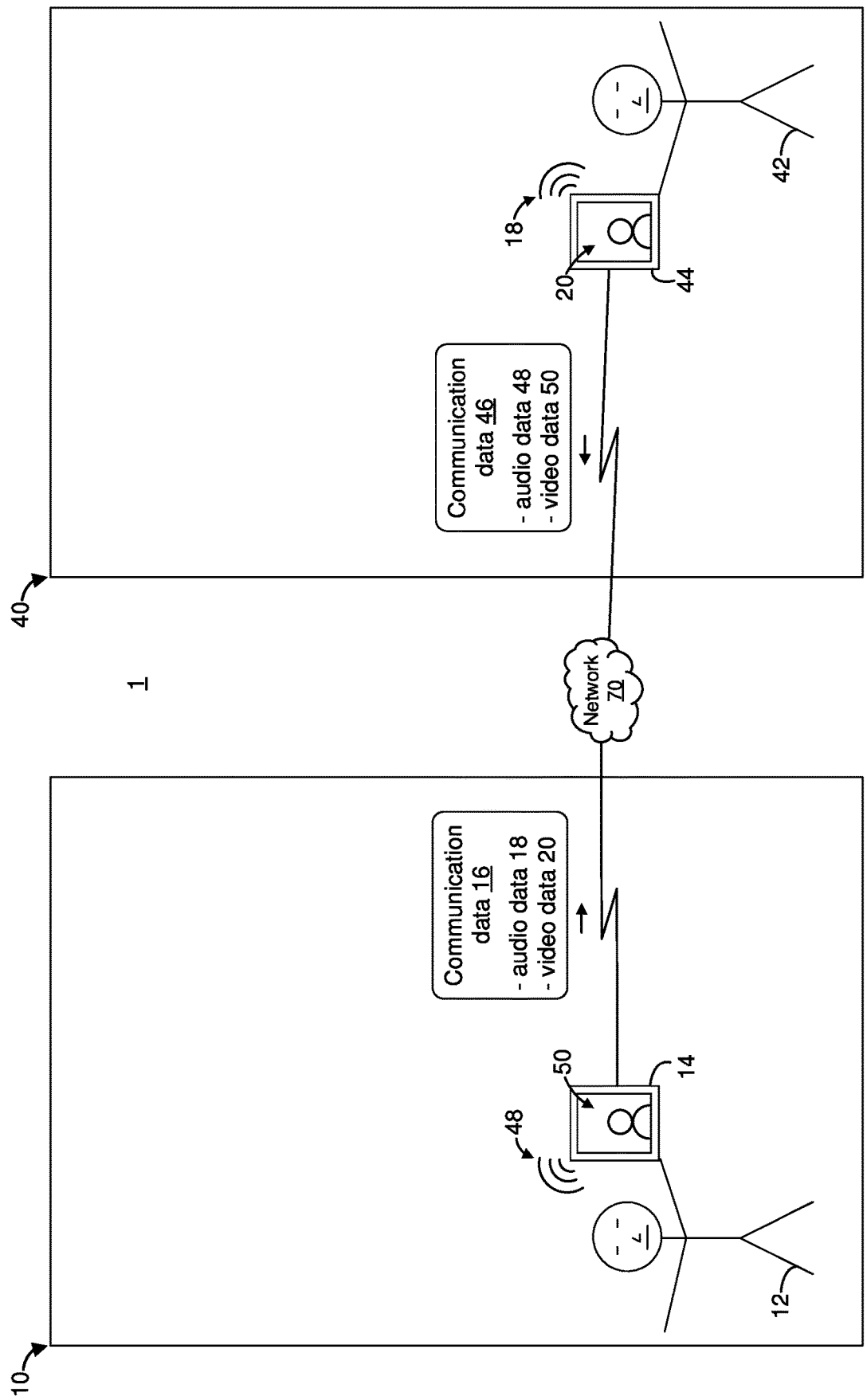
FIGS. 1A-1G are diagrams of example operating environments in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting communication data. In various implementations, a first device associated with a first person includes a display, a non-transitory memory and one or more processors coupled with the display and the non-transitory memory. In some implementations, a method includes obtaining communication data associated with a second device corresponding to a second person. In some implementations, the method includes determining whether the first device and the second device are in a shared environment. In some implementations, the method includes in response to determining that the first device and the second device are not in a shared environment, displaying a representation of the second person based on the communication data associated with the second device.

Various implementations disclosed herein include devices, systems, and methods for masking communication data. In various implementations, a first device includes an output device, a non-transitory memory and one or more processors coupled with the output device and the non-transitory memory. In some implementations, a method includes, while the first device is in a communication session with a second device, obtaining communication data associated with the second device. In some implementations, the method includes determining that the first device and the second device are in a shared physical setting. In some implementations, the method includes masking a portion of the communication data in order to prevent the output device from outputting the portion of the communication data.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

When a first device associated with a first person communicates with a second device associated with a second person, presenting a video or an XR representation of the second person on the first device may sometimes not be sensible. For example, if the first device and the second device are in the same environment, then presenting the video or the XR representation of the second person on the first device may not be sensible because the first person can see the second person. In some scenarios, indicating a type of the second device may be helpful, so that the first person knows how to interact with the second person. For example, if the second device provides the second person with a limited view of a surrounding environment of the first device, then the first person need not point to areas of the surrounding environment that are not visible to the second person.

The present disclosure provides methods, devices and/or systems that allow a first device to present communication data associated with a second device based on a presence status of the second device. When the first device obtains communication data associated with the second device, the first device presents a video or an XR representation of the second person if the second device is not in the same environment as the first device. If the second device is in the same environment as the first device, then the first device presents a pass-through of the environment and forgoes presenting the video or the XR representation encoded in the communication data. In some scenarios, the first device presents the XR representation of the second person when the second device includes an HMD, and the first device presents the video when the second device includes a non-HMD device (e.g., a handheld device such as a tablet or a smartphone, a laptop and/or a desktop).

When a first device associated with a first person communicates with a second device associated with a second person, presenting network audio and video may result in a detracted experience due to inaudible speech and nonsensible video. For example, if the first device and the second device are in the same physical setting, then the first person will likely hear network audio through the first device and direct audio from the second person. Interference between the network audio and the direct audio may result in inaudible speech. Similarly, if the first device displays an XR representation of the second person while the second device is in the same physical setting as the first device, the first person may look at the XR representation of the second person instead of the second person resulting in a detracted communication experience.

The present disclosure provides methods, devices and/or systems for masking communication data when the first device and the second device are in the same physical setting. If the second device is in the same physical setting as the first device, then the first device masks the network audio in order to reduce the interference between the network audio and the direct audio. Masking the network audio when the second device is in the same physical setting as the first device allows the first person to listen to the direct audio. If the second device is in the same physical setting as the first device, then the first device masks a video or an XR representation of the second person indicated by the communication data. Forgoing the display of the video or the XR representation of the second person improves the user experience for the first person by allowing the first person to look at the second person. In some scenarios, the first device presents a pass-through of the physical setting and the first person sees the second person via the pass-through.

FIG. 1A is a block diagram of an example operating environment 1 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 1 includes a first environment 10 (e.g., a first setting) and a second environment 40 (e.g., a second setting). In some implementations, the first environment 10 includes a first physical setting (e.g., a first physical environment), and the second environment 40 includes a second physical setting (e.g., a second physical environment). In some implementations, the first environment 10 includes a first XR environment, and the second environment 40 includes a second XR environment.

As shown in FIG. 1A, the first environment 10 includes a first person 12 that is associated with (e.g., operating) a first electronic device 14, and the second environment 40 includes a second person 42 that is associated with (e.g., operating) a second electronic device 44. In the example of FIG. 1A, the first person 12 is holding the first electronic device 14, and the second person 42 is holding the second electronic device 44. In various implementations, the first electronic device 14 and the second electronic device 44 include handheld devices (e.g., tablets, smartphones or laptops). In some implementations, the first electronic device 14 and the second electronic device 44 are not head-mountable devices (e.g., non-HMD devices such as handheld devices, desktop computers or watches).

In various implementations, the first electronic device 14 and the second electronic device 44 communicate with each other via a network 70 (e.g., a portion of the Internet, a Wide Area Network (WAN), a Local Area Network (LAN), etc.). While the first electronic device 14 and the second electronic device 44 are communicating with each other, the first electronic device 14 transmits first communication data 16 and the second electronic device 44 transmits second communication data 46. The first communication data 16 includes first audio data 18 captured by a microphone of the first electronic device 14, and first video data 20 captured by an image sensor (e.g., a camera, for example, a front-facing camera) of the first electronic device 14. Similarly, the second communication data 46 includes second audio data 48 captured by a microphone of the second electronic device 44, and second video data 50 captured by an image sensor of the second electronic device 44.

The first electronic device 14 receives the second communication data 46, and the second electronic device 44 receives the first communication data 16. As shown in FIG. 1A, the first electronic device 14 presents the second communication data 46, and the second electronic device 44 presents the first communication data 16. For example, the first electronic device 14 outputs (e.g., plays) the second audio data 48 via a speaker of the first electronic device 14, and displays the second video data 50 on a display of the first electronic device 14. Similarly, the second electronic device 44 outputs the first audio data 18 via a speaker of the second electronic device 44, and displays the first video data 20 on a display of the second electronic device 44. In various implementations, the first audio data 18 encodes speech input provided by the first person 12, and the first video data 20 encodes a video stream of the first person 12. Similarly, the second audio data 48 encodes speech input provided by the second person 42, and the second video data 50 encodes a video stream of the second person 42.

In various implementations, the first electronic device 14 determines whether the second electronic device 44 is in the first environment 10. When the first electronic device 14 determines that the second electronic device 44 is in the first environment 10, the first electronic device 14 considers the second electronic device 44 to be local. In various implementations, when the first electronic device 14 determines that the second electronic device 44 is local, the first electronic device 14 alters the presentation of the second communication data 46. In various implementations, the first electronic device 14 masks a portion of the second communication data 46 in response to determining that the second electronic device 44 is local. For example, in some implementations, the first electronic device 14 forgoes outputting the second audio data 48 and/or forgoes displaying the second video data 50 in response to determining that the second electronic device 44 is local.

In the example of FIG. 1A, the first electronic device 14 determines that the second electronic device 44 is not in the first environment 10. When the first electronic device 14 determines that the second electronic device 44 is not in the first environment 10, the first electronic device 14 considers the second electronic device 44 to be remote. As shown in FIG. 1A, the first electronic device 14 presents the second communication data 46 in response to determining that the second electronic device 44 is remote. For example, the first electronic device 14 outputs the second audio data 48 and/or displays the second video data 50 in response to the second electronic device 44 being remote. In some implementations, the first electronic device 14 forgoes masking the second communication data 46 in response to determining that the second electronic device 44 is remote.

Figure 1B:
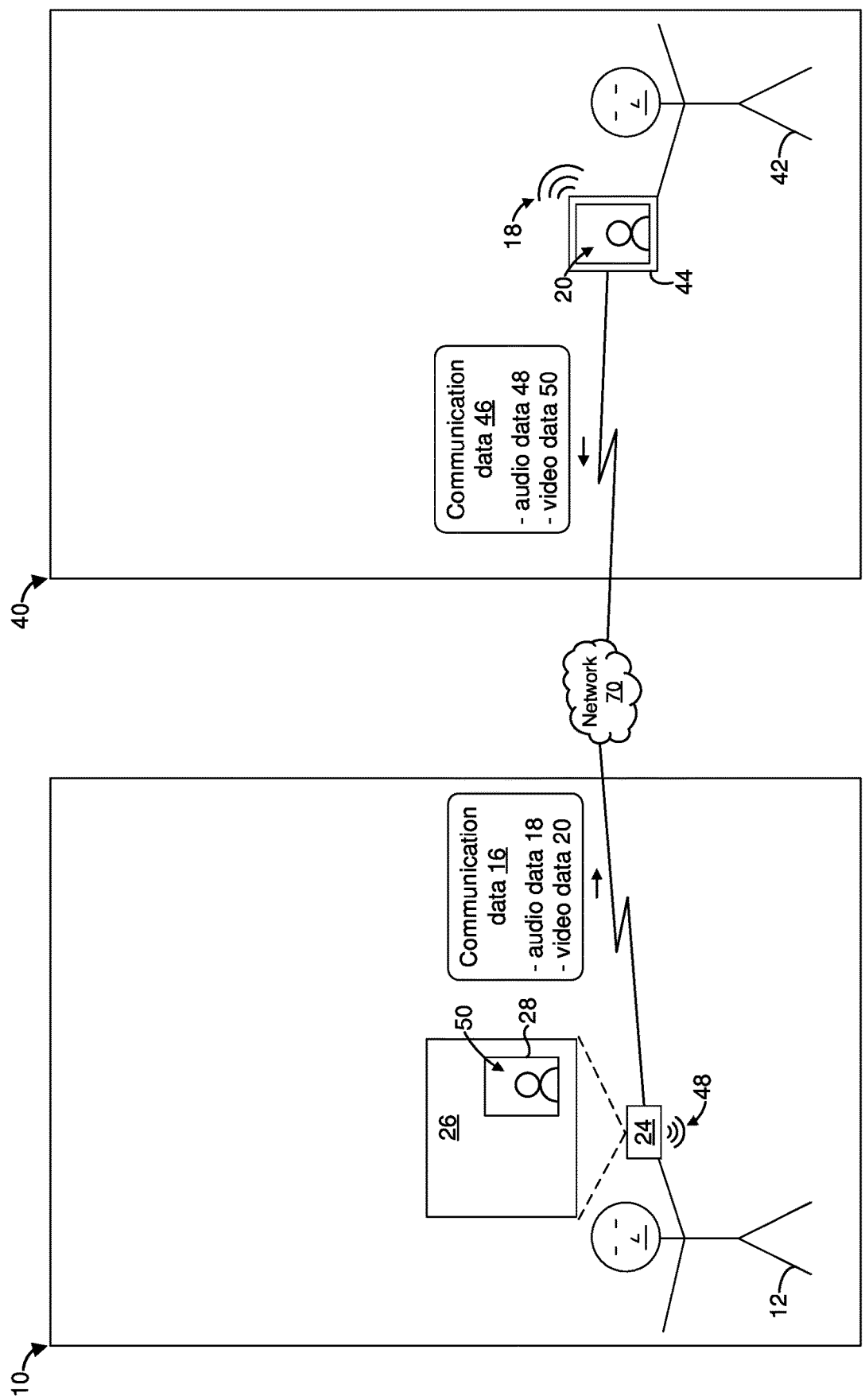

Referring to FIG. 1B, a first head-mountable device (HMD) 24, being worn by the first person 12, presents (e.g., displays) a first XR environment 26 according to various implementations. Although FIG. 1B illustrates the first person 12 holding the first HMD 24, in various implementations, the first person 12 wears the first HMD 24 on a head of the first person 12. In some implementations, the first HMD 24 includes an integrated display (e.g., a built-in display) that displays the first XR environment 26. In some implementations, the first HMD 24 includes a head-mountable enclosure. In various implementations, the head-mountable enclosure includes an attachment region to which another device with a display can be attached. For example, in some implementations, the first electronic device 14 can be attached to the head-mountable enclosure. In various implementations, the head-mountable enclosure is shaped to form a receptacle for receiving another device that includes a display (e.g., the first electronic device 14). For example, in some implementations, the first electronic device 14 slides/snaps into or otherwise attaches to the head-mountable enclosure. In some implementations, the display of the device attached to the head-mountable enclosure presents (e.g., displays) the first XR environment 26. In various implementations, examples of the first electronic device 14 include smartphones, tablets, media players, laptops, etc.

In the example of FIG. 1B, the first XR environment 26 presents (e.g., displays) the second video data 50 within a card graphical user interface (GUI) element 28. In some implementations, the card GUI element 28 is within a similarity threshold of a card (e.g., a visual appearance of the card GUI element 28 resembles a visual appearance of a card). In some implementations, the card GUI element 28 is referred to as a video card. In some implementations, the first HMD 24 presents the second video data 50 in the card GUI element 28 based on a type of the second electronic device 44. For example, the first HMD 24 presents the second video data 50 in the card GUI element 28 in response to determining that the second electronic device 44 is a non-HMD (e.g., a handheld device such as a tablet, a smartphone or a laptop, a desktop computer, or a watch). In some implementations, the first HMD 24 outputs (e.g., plays) the second audio data 48 via a speaker of the first HMD 24. In some implementations, the first HMD 24 spatializes the second audio data 48 in order to provide an appearance that the second audio data 48 is originating from the card GUI element 28. In some implementations, the first HMD 24 changes a position of the card GUI element 28 within the first XR environment 26 based on a movement of the second person 42 and/or the second electronic device 44 within the second environment 40. For example, the first HMD 24 moves the card GUI element 28 in the same direction as the second person 42 and/or the second electronic device 44.

Figure 1C:
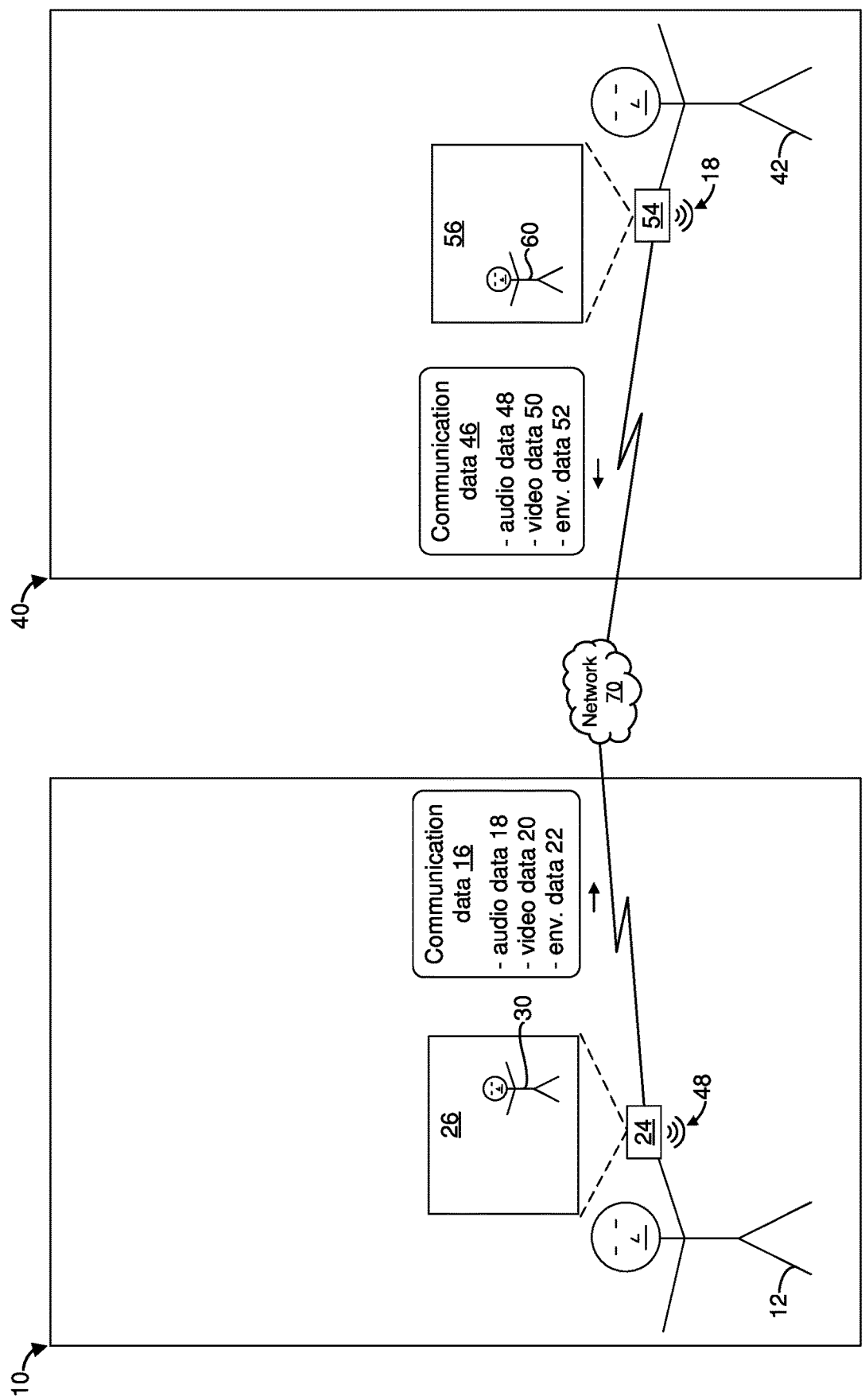

Referring to FIG. 1C, a second HMD 54, being worn by the second person 42, presents (e.g., displays) a second XR environment 56 according to various implementations. Although FIG. 1C illustrates the second person 42 holding the second HMD 54, in various implementations, the second person 42 wears the second HMD 54 on a head of the second person 42. In some implementations, the second HMD 54 includes an integrated display (e.g., a built-in display) that displays the second XR environment 56. In some implementations, the second HMD 54 includes a head-mountable enclosure. In various implementations, the head-mountable enclosure includes an attachment region to which another device with a display can be attached. For example, in some implementations, the second electronic device 44 can be attached to the head-mountable enclosure. In various implementations, the head-mountable enclosure is shaped to form a receptacle for receiving another device that includes a display (e.g., the second electronic device 44). For example, in some implementations, the second electronic device 44 slides/snaps into or otherwise attaches to the head-mountable enclosure. In some implementations, the display of the device attached to the head-mountable enclosure presents (e.g., displays) the second XR environment 56. In various implementations, examples of the second electronic device 44 include smartphones, tablets, media players, laptops, etc.

As shown in FIG. 1C, in some implementations, the first communication data 16 includes first environmental data 22, and the second communication data 46 includes second environmental data 52. In some implementations, the first environmental data 22 indicates various properties and/or characteristics of the first environment 10, and the second environmental data 52 indicates various properties and/or characteristics of the second environment 40. In some implementations, the first environmental data 22 indicates physical elements that are located in the first environment 10, and the second environmental data 52 indicates physical elements that are allocated in the second environment 40. In some implementations, the first environmental data 22 includes a mesh map of the first environment 10, and the second environmental data 52 includes a mesh map of the second environment 40. In some implementations, the first environmental data 22 indicates a body pose of the first person 12, and the second environmental data 52 indicates a body pose of the second person 42. In some implementations, the first environmental data 22 indicates facial expressions of the first person 12, and the second environmental data 52 indicates facial expressions of the second person 42. In some implementations, the first environmental data 22 includes a mesh map of a face of the first person 12, and the second environmental data 52 includes a mesh map of a face of the second person 42.

In various implementations, the first HMD 24 presents an XR object 30 representing the second person 42. In some implementations, the first HMD 24 generates the XR object 30 based on the second environmental data 52. For example, in some implementations, the second environmental data 52 encodes the XR object 30 representing the second person 42. In various implementations, the XR object 30 includes an XR representation of the second person 42. For example, in some implementations, the XR object 30 includes an avatar of the second person 42. In some implementations, the second environmental data 52 indicates a body pose of the second person 42, and the XR object 30 has a pose that is within a degree of similarity to the body pose of the second person 42. In some implementations, the second environmental data 52 indicates a physical facial expression of the second person 42, and an XR face of the XR object 30 has an XR expression that is within a degree of similarity to the physical facial expression of the second person 42. In various implementations, the second environmental data 52 indicates movements of the second person 42, and the XR object 30 mimics the movements of the second person 42.

In various implementations, the second HMD 54 presents an XR object 60 representing the first person 12. In some implementations, the second HMD 54 generates the XR object 60 based on the first environmental data 22. For example, in some implementations, the first environmental data 22 encodes the XR object 60 representing the first person 12. In various implementations, the XR object 60 includes an XR representation of the first person 12. For example, in some implementations, the XR object 60 includes an avatar of the first person 12. In some implementations, the first environmental data 22 indicates a body pose of the first person 12, and the XR object 60 has a pose that is within a degree of similarity to (e.g., within a similarity threshold of) the body pose of the first person 12. In some implementations, the first environmental data 22 indicates a physical facial expression of the first person 12, and an XR face of the XR object 60 has an XR expression that is within a degree of similarity to (e.g., within a similarity threshold of) the physical facial expression of the first person 12. In various implementations, the first environmental data 22 indicates movements of the first person 12, and the XR object 60 mimics the movements of the first person 12.

In various implementations, the first HMD 24 presents the XR object 30 based on a type of device associated with the second person 42. In some implementations, the first HMD 24 generates and presents the XR object 30 in response to determining that the second person 42 is utilizing an HMD instead of a non-HMD. In some implementations, the first HMD 24 determines that the second person 42 is utilizing the second HMD 54 in response to obtaining the second communication data 46 that includes the second environmental data 52. In some implementations, the first HMD 24 spatializes the second audio data 48 in order to provide an appearance that the second audio data 48 is originating from the XR object 30. Presenting the XR object 30 enhances a user experience of the first HMD 24. For example, presenting the XR object 30 provides an appearance that the second person 42 is in the first environment 10 even though the second person 42 is actually remote.

Figure 1D:
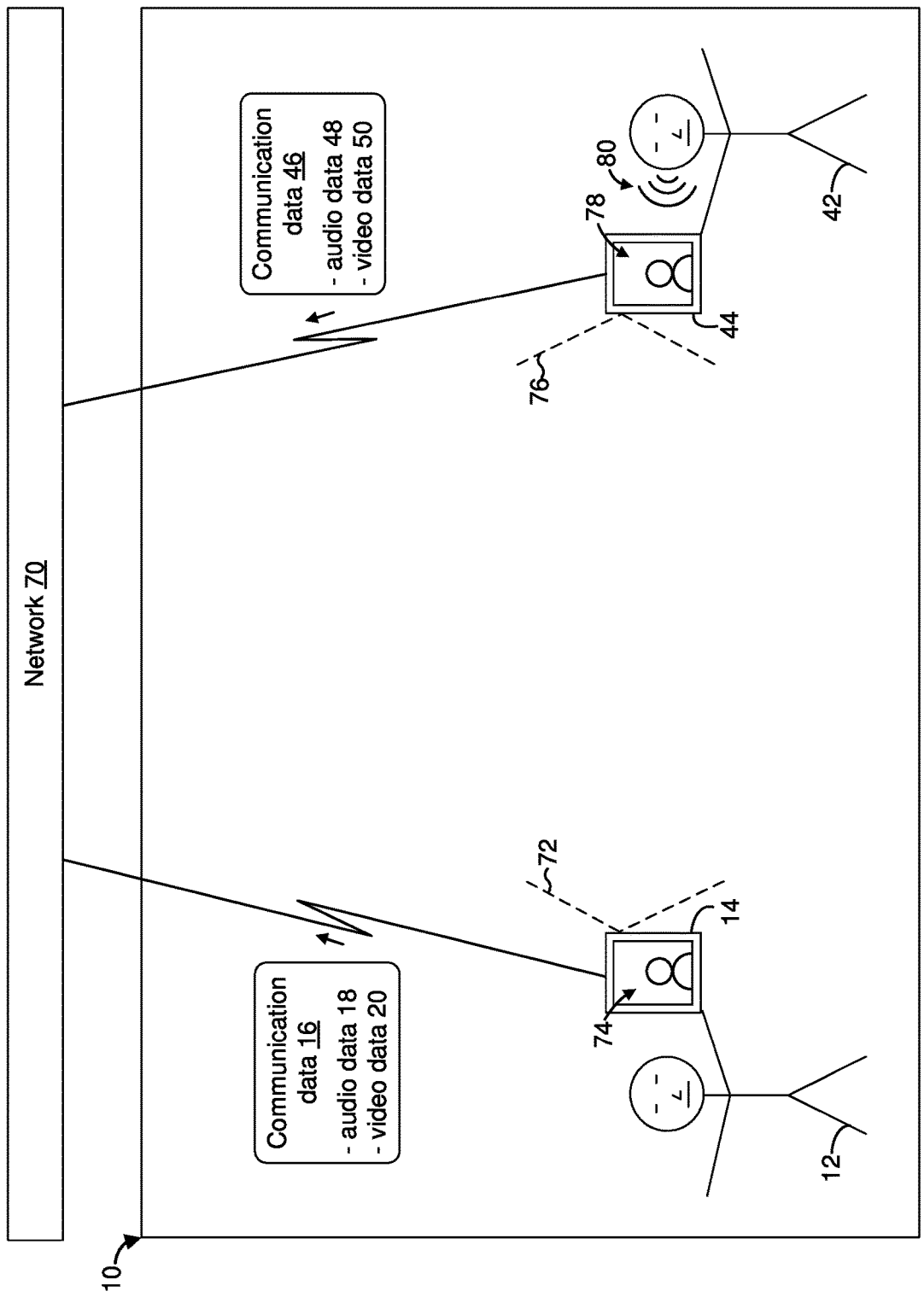

In the example of FIG. 1D, the first person 12 and the second person 42 are in the first environment 10. Consequently, the first electronic device 14 and the second electronic device 44 are in the first environment 10. In the example of FIG. 1D, the first electronic device 14 determines that the second electronic device 44 is in the first environment 10. When the first electronic device 14 and the second electronic device 44 are in the same environment, the environment can be referred to as a shared environment (e.g., a shared physical setting). When the first electronic device 14 detects that the second electronic device 44 is in the same environment as the first electronic device 14, the first electronic device 14 considers the second electronic device 44 to be local (e.g., instead of remote).

In various implementations, the first electronic device 14 masks a portion of the second communication data 46 in response to determining that the second electronic device 44 is local. For example, in some implementations, the first electronic device 14 forgoes displaying the second video data 50 on a display of the first electronic device 14. Since the first electronic device 14 does not display the second video data 50, the first electronic device 14 allows the first person 12 to look at the second person 42 without being distracted by the presentation of the second video data 50. In some implementations, the first electronic device 14 forgoes playing the second audio data 48 through a speaker of the first electronic device 14. In some implementations, not playing the second audio data 48 allows the first person 12 to hear speech 80 of the second person 42. Since the first electronic device 14 is not playing the second audio data 48, the second audio data 48 does not interfere with the speech 80 of the second person 42 thereby allowing the first person 12 to hear the speech 80. Similarly, in some implementations, the second electronic device 44 masks a portion of the first communication data 16 in response to determining that the first electronic device 14 is local (e.g., the second electronic device 44 forgoes displaying the first video data 20 and/or forgoes playing the first audio data 18). As described herein, in some implementations, the first communication data 16 includes the first environmental data 22 (shown in FIG. 1C), and the second communication data 46 includes the second environmental data 52 (shown in FIG. 1C). In such implementations, the first electronic device 14 masks a portion of the second environmental data 52 and the second electronic device 44 masks a portion of the first environmental data 22 when the first and second electronic devices 14 and 44 are local.

In some implementations, the first electronic device 14 displays a first video pass-through 74 of the first environment 10. In some implementations, the first electronic device 14 includes an image sensor (e.g., a rear-facing camera) that has a first field-of-view 72. The first video pass-through 74 represents a video feed being captured by the image sensor of the first electronic device 14. Since the second person 42 is in the first field-of-view 72, the first video pass-through 74 includes a representation of the second person 42 (e.g., a video feed of the second person 42). Similarly, in some implementations, the second electronic device 44 displays a second video pass-through 78 of the first environment 10. In some implementations, the second electronic device 44 includes an image sensor that has a second field-of-view 76. The second video pass-through 78 represents a video feed being captured by the image sensor of the second electronic device 44. Since the first person 12 is in the first field-of-view 76, the second video pass-through 78 includes a representation of the first person 12 (e.g., a video feed of the first person 12).

Figure 1E:
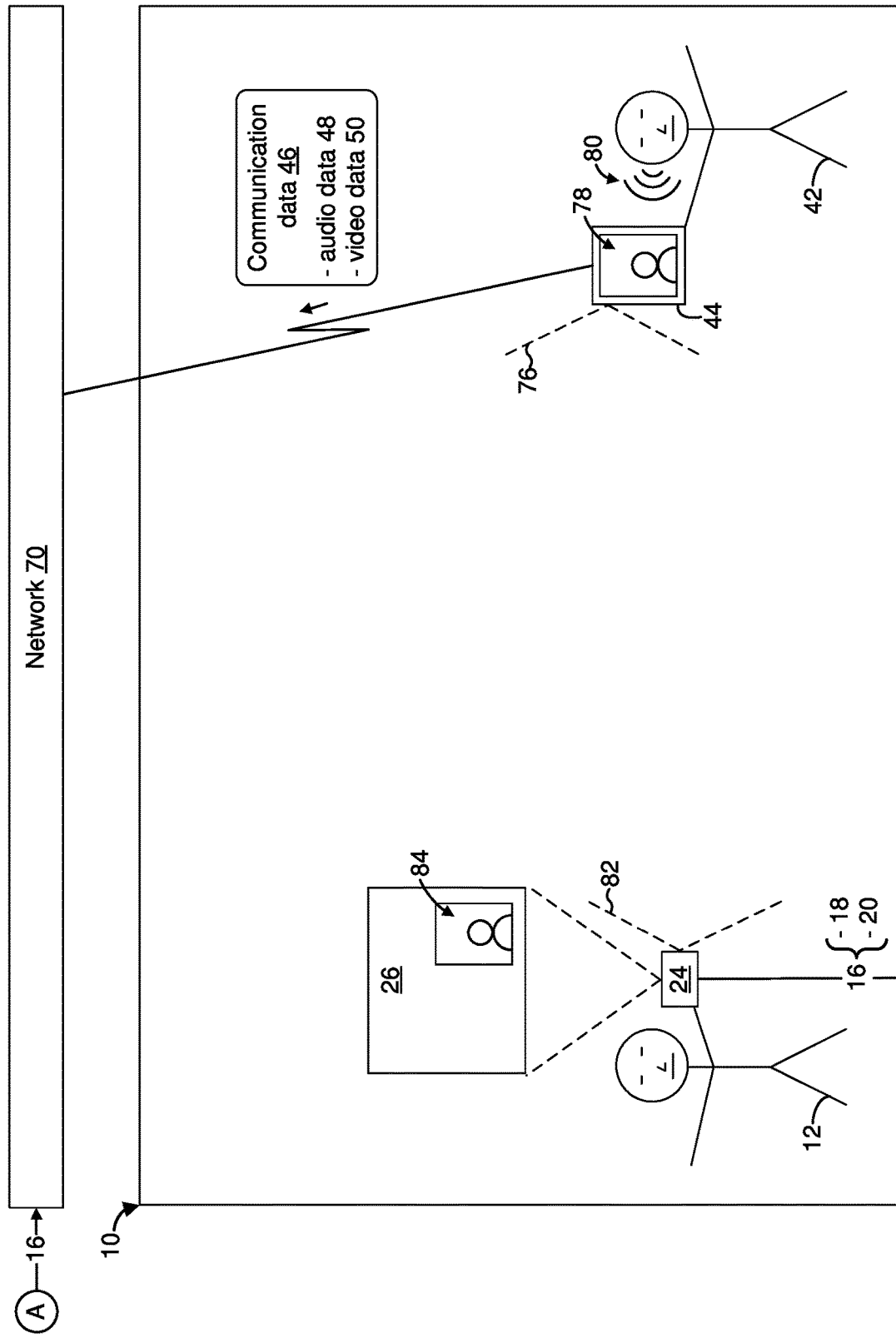

Referring to FIG. 1E, the first HMD 24 masks a portion of the second communication data 46 in response to determining that the second electronic device 44 is local. For example, in some implementations, the first HMD 24 forgoes displaying the second video data 50 and/or the XR object 30 (shown in FIG. 1C) representing the second person 42 within the first XR environment 26. In some implementations, the first HMD 24 forgoes playing the second audio data 48 through a speaker of the first HMD 24. In some implementations, not playing the second audio data 48 allows the first person 12 to hear speech 80 of the second person 42. Since the first HMD 24 is not playing the second audio data 48, the second audio data 48 does not interfere with the speech 80 of the second person 42 thereby allowing the first person 12 to hear the speech 80.

In some implementations, the first HMD 24 presents a first pass-through 84 of the first environment 10. In some implementations, the first HMD 24 includes an environmental sensor (e.g., a depth sensor such as a depth camera, and/or an image sensor such as a rear-facing camera) that has a first field-of-detection 82. In some implementations, the first pass-through 84 includes a video pass-through that is similar to the first video pass-through 74 shown in FIG. 1D. In some implementations, the first pass-through 84 includes an optical pass-through in which light (e.g., natural light or artificial light) from the first environment 10 is allowed to enter eyes of the first person 12. Since the second person 42 is in the first field-of-detection 82, the first pass-through 84 includes a representation of the second person 42 (e.g., a video feed of the second person 42, or light that is reflected off the second person 42). Presenting the first pass-through 84 enhances a user experience provided by the first HMD 24 because the first pass-through 84 tends to have a lower latency than displaying the second video data 50 or generating the XR object 30 based on the second environmental data 52.

Figure 1F:
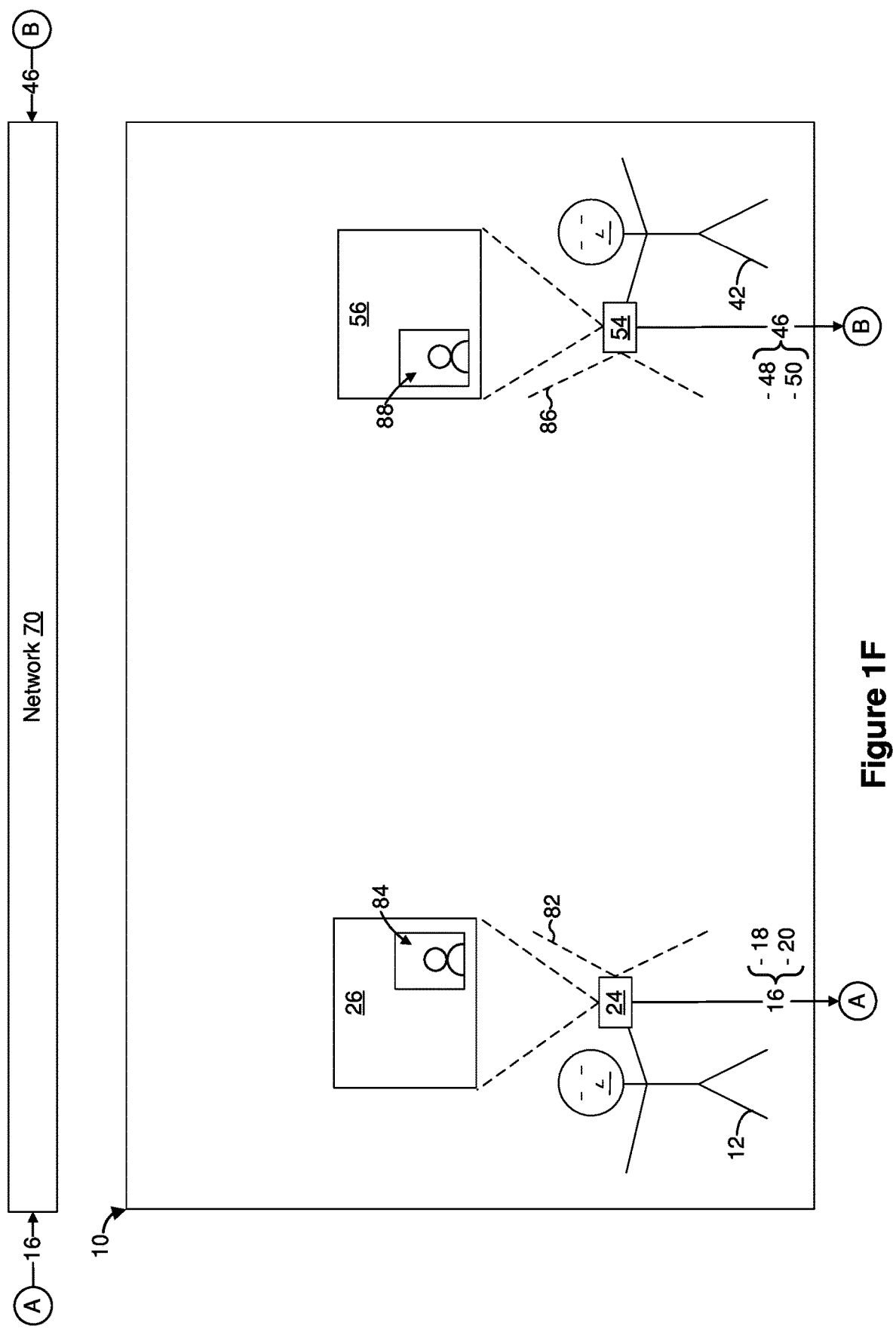

Referring to FIG. 1F, the second HMD 54 masks a portion of the first communication data 16 in response to determining that the first HMD 24 is local. For example, in some implementations, the second HMD 54 forgoes displaying the first video data 20 or the XR object 60 (shown in FIG. 1C) representing the first person 12 within the second XR environment 56. In some implementations, the second HMD 54 forgoes playing the first audio data 18 through a speaker of the second HMD 54. In some implementations, not playing the first audio data 18 allows the second person 42 to hear speech of the first person 12 (e.g., direct audio from the first person 12). Since the second HMD 54 is not playing the first audio data 18, the first audio data 18 does not interfere with the speech of the first person 12 thereby allowing the second person 42 to hear the speech.

In some implementations, the second HMD 54 presents a second pass-through 88 of the first environment 10. In some implementations, the second HMD 54 includes an environmental sensor (e.g., a depth sensor such as a depth camera, and/or an image sensor such as a rear-facing camera) that has a second field-of-detection 86. In some implementations, the second pass-through 88 includes a video pass-through that is similar to the second video pass-through 78 shown in FIG. 1D. In some implementations, the second pass-through 88 includes an optical pass-through in which light (e.g., natural light or artificial light) from the first environment 10 is allowed to enter eyes of the second person 42. Since the first person 12 is in the second field-of-detection 86, the second pass-through 88 includes a representation of the first person 12 (e.g., a video feed of the first person 12, or light that is reflected off the first person 12). Presenting the second pass-through 88 enhances a user experience provided by the second HMD 54 because the second pass-through 88 tends to have a lower latency than displaying the first video data 20 or generating the XR object 60 based on the first environmental data 22.

Figure 1G:
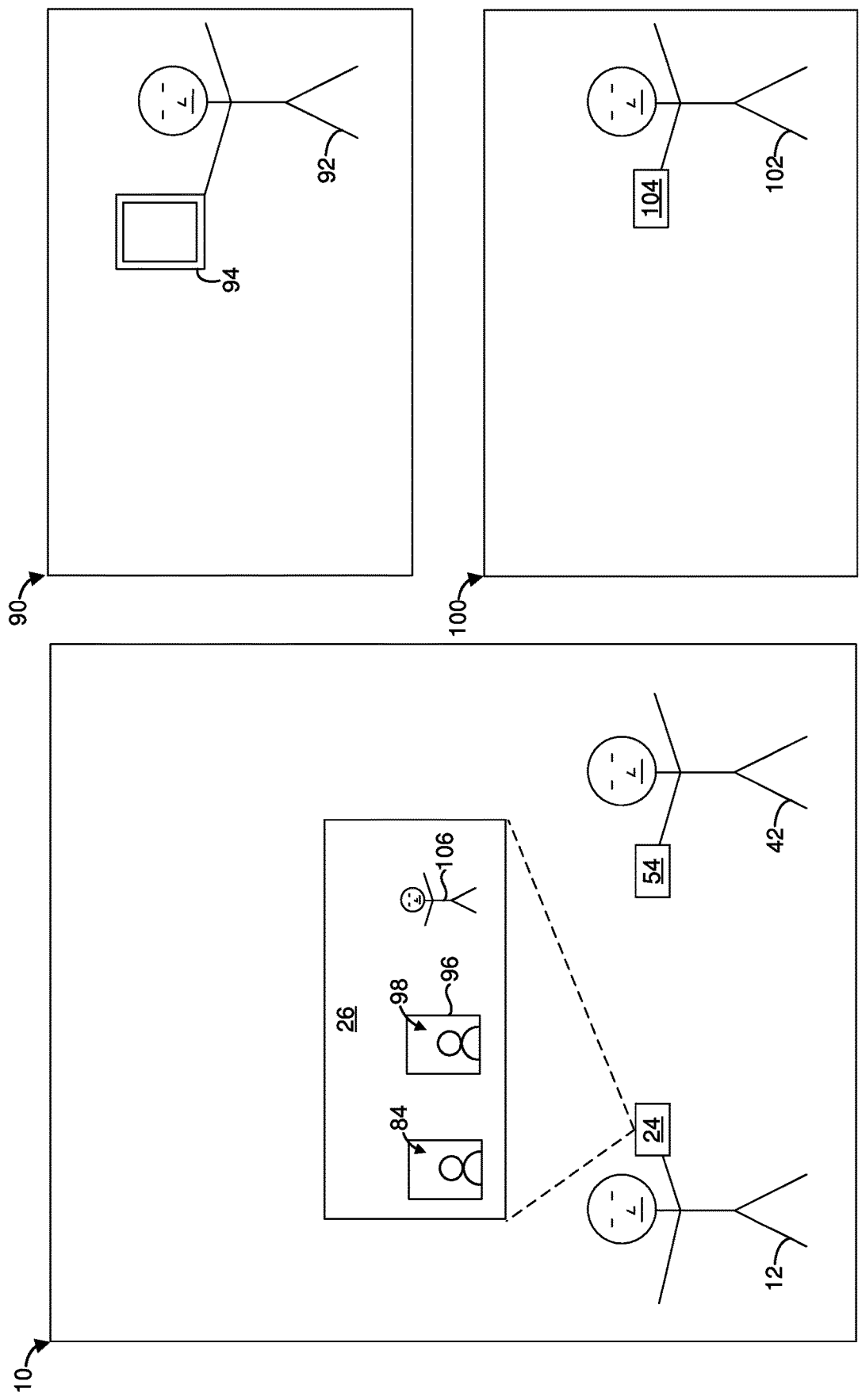

As shown in FIG. 1G, in some implementations, the first HMD 24 communicates with multiple devices. FIG. 1G illustrates a third environment 90 that includes a third person 92 associated with a third electronic device 94. FIG. 1G also illustrates a fourth environment 100 that includes a fourth person 102 associated with a third HMD 104 (e.g., the fourth person 102 is wearing the third HMD 104 on a head of the fourth person 102). In the example of FIG. 1G, the first HMD 24 is communicating with the second HMD 54, the third electronic device 94 and the third HMD 104. In some implementations, the first HMD 24, the second HMD 54, the third electronic device 94 and the third HMD 104 are in a teleconference (e.g., in a teleconferencing session).

In some implementations, the first HMD 24 determines that the second HMD 54 is local because the second HMD 54 is in the same environment as the first HMD 24. As such, as described herein, in some implementations, the first HMD 24 masks a portion of the communication data associated with the second HMD 54. Furthermore, as described herein, in some implementations, the first HMD 24 presents the first pass-through 84 of the first environment 10. As shown in FIG. 1G, the first HMD 24 presents the first pass-through 84 within the first XR environment 26.

In some implementations, the first HMD 24 determines that the third electronic device 94 is remote because the third electronic device 94 is not in the same environment as the first HMD 24. In some implementations, the first HMD 24 determines that the third electronic device 94 is a non-HMD (e.g., a tablet, a smartphone, a media player, a laptop or a desktop computer). In the example of FIG. 1G, the first HMD 24 displays a card GUI element 96 that includes video data 98 associated with (e.g., originating from) the third electronic device 94.

In some implementations, the first HMD 24 determines that the third HMD 104 is remote because the third HMD 104 is not in the same environment as the first HMD 24. In some implementations, the first HMD 24 determines that the fourth person 102 is utilizing an HMD-type device. As such, as shown in FIG. 1G, the first HMD 24 displays an XR object 106 representing the fourth person 102. In some implementations, the XR object 106 includes an XR representation of the fourth person 102. In some implementations, the XR object 106 includes an avatar of the fourth person 102.

Figure 2A:
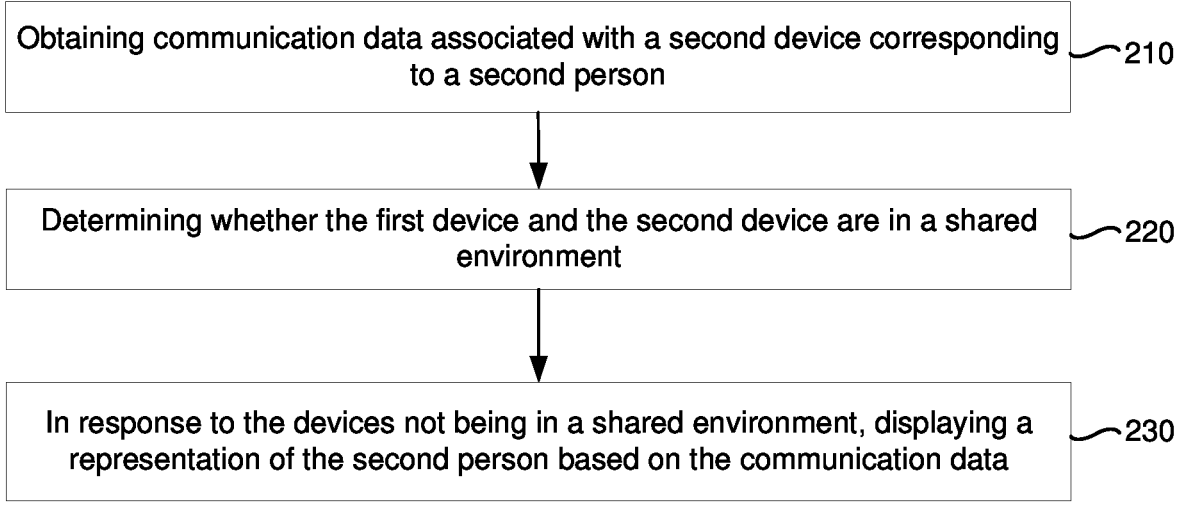
FIGS. 2A-2D are flowchart representations of a method of presenting communication data in accordance with some implementations.

FIG. 2A is a flowchart representation of a method 200 of presenting communication data. In various implementations, the method 200 is performed by a first device associated with a first person. In some implementations, the first device includes a display, a non-transitory memory and one or more processors coupled with the display and the non-transitory memory. In some implementations, the method 200 is performed by the first electronic device 14, the second electronic device 44, the first HMD 24 and/or the second HMD 54. In some implementations, the method 200 is performed by processing logic, including hardware, firmware, software, or a combination thereof. In some implementations, the method 200 is performed by a processor executing code stored in a non-transitory computer-readable medium (e.g., a memory).

As represented by block 210, in various implementations, the method 200 includes obtaining communication data associated with (e.g., originating from or generated by) a second device corresponding to a second person. For example, as shown in FIG. 1A, the first electronic device 14 obtains the second communication data 46 associated with the second electronic device 44. In some implementations, the method 200 includes receiving the communication data over a network. In some implementations, the communication data includes audio data (e.g., network audio, for example, the second audio data 48 shown in FIGS. 1A-1F). In some implementations, the communication data includes video data (e.g., the second video data 50 shown in FIGS. 1A-1F). In some implementations, the communication data includes environmental data (e.g., the second environmental data 52 shown in FIG. 1C). In some implementations, the communication data (e.g., the video data and/or the environmental data) encodes an XR object (e.g., an avatar) representing the second person.

As represented by block 220, in various implementations, the method 200 includes determining whether or not the first device and the second device are in a shared environment. In some implementations, the method 200 includes determining, by the first device, whether or not the second device is in the same environment as the first device. For example, the first electronic device 14 determines whether or not the second electronic device 44 is in the first environment 10. In some implementations, the method 200 includes determining, by the first device, whether or not the second device is local or remote.

As represented by block 230, in various implementations, the method 200 includes, in response to determining that the first device and the second device are not in a shared environment, displaying an XR representation of the second person based on the communication data associated with the second device. In some implementations, displaying the XR representation includes displaying video data included in the communication data. For example, as shown in FIG. 1A, the first electronic device 14 displays the second video data 50 in response to determining that the second electronic device 44 is not in the first environment 10. In some implementations, displaying the XR representation includes displaying an XR environment, displaying a card GUI element within the XR environment, and displaying video data associated with the second device within the card GUI element. For example, as shown in FIG. 1B, the first HMD 24 displays the first XR environment 26, the card GUI element 28 within the first XR environment 26, and the second video data 50 within the card GUI element 28. In some implementations, displaying the XR representation includes generating an XR object based on video data and/or environmental data associated with the second device, and displaying the XR object in an XR environment. For example, as shown in FIG. 1C, the first HMD 24 generates and displays the XR object 30 representing the second person 42.

Figure 2B:
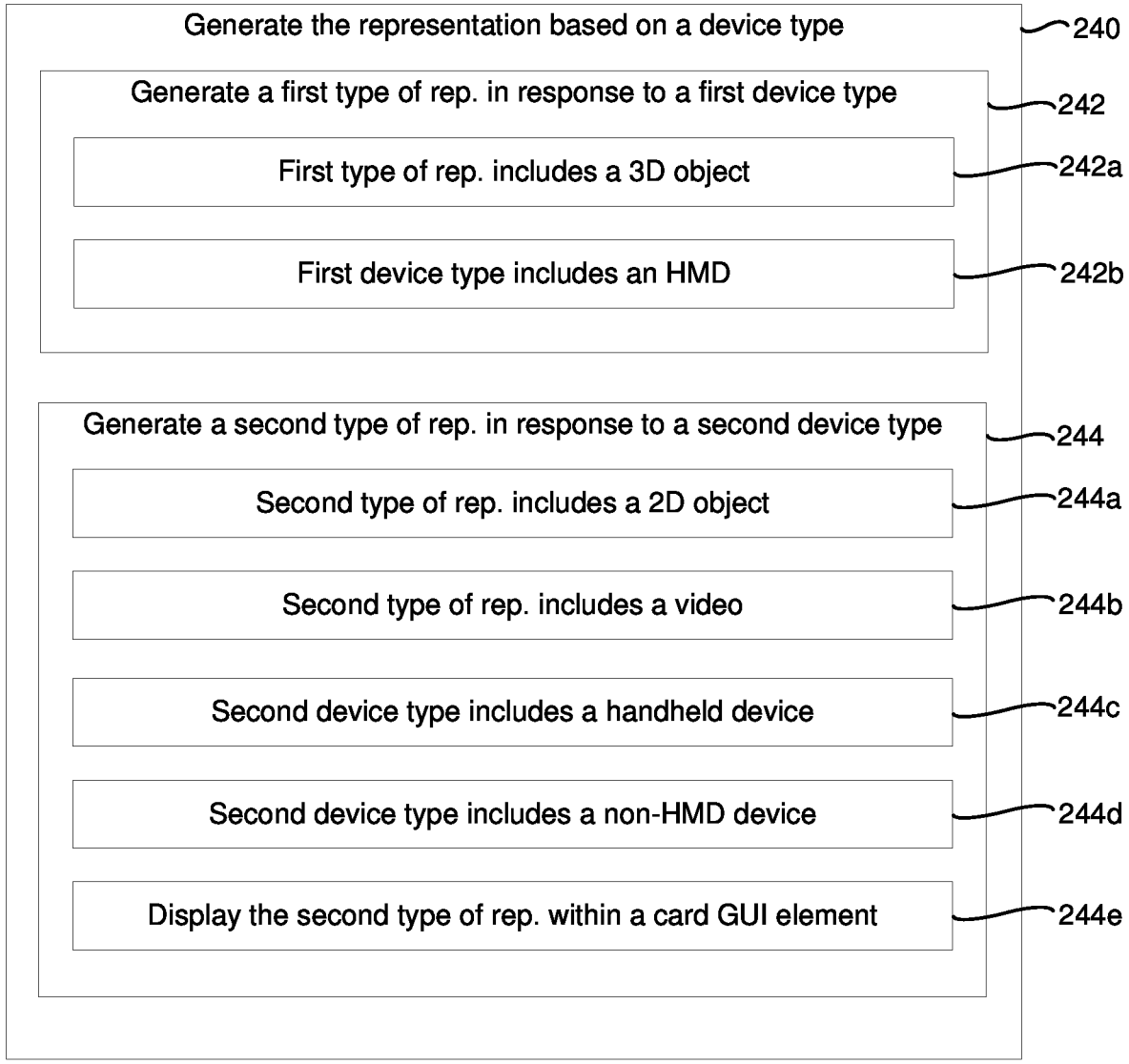

Referring to FIG. 2B, as represented by block 240, in some implementations, the method 200 includes determining a device type of the second device, and generating the XR representation of the second person based on the device type. For example, as shown in FIGS. 1B-1C, the first HMD 24 determines a device type of the device associated with the second person 42, and generates the XR representation of the second person based on the device type. In the example of FIG. 1B, the first HMD 24 determines that the second person 42 is using a non-HMD, and the first HMD 24 decodes and displays the second video data 50 within the card GUI element 28. In the example of FIG. 1C, the first HMD 24 determines that the second person 42 is using an HMD, and the first HMD 24 generates and displays the XR object 30 representing the second person 42.

As represented by block 242, in some implementations, the method 200 includes in response to the device type being a first device type, generating a first type of the XR representation of the second person based on the communication data associated with the second device. As represented by block 242a, in some implementations, generating the first type of the XR representation of the second person includes generating a three-dimensional (3D) XR object (e.g., an avatar) that represents the second person. As represented by block 242b, in some implementations, the first device type includes an HMD. For example, as shown in FIG. 1C, the first HMD 24 generates the XR object 30 representing the second person 42 in response to determining that the second person 42 is using an HMD.

As represented by block 244, in some implementations, the method 200 includes in response to the device type being a second device type, generating a second type of the XR representation of the second person based on the communication data associated with the second device. As represented by block 244a, in some implementations, generating the second type of the XR representation of the second person includes generating a two-dimensional (2D) XR object that represents the second person. As represented by block 244b, in some implementations, the second type of the XR representation includes a video of the second person. In some implementations, the video is encoded in the communication data associated with the second device. As represented by block 244c, in some implementations, the second device type includes a handheld device (e.g., a smartphone, a tablet, a laptop, a media player, and/or a watch). As represented by block 244d, in some implementations, the second device type includes a device that is not an HMD (e.g., a non-HMD such as a handheld device, a desktop computer, a television and/or a projector). As represented by block 244e, in some implementations, the method 200 includes displaying the second type of the XR representation of the second person within a GUI element that is within a degree of similarity to a card (e.g., a card GUI element, for example, the card GUI element 28 shown in FIG. 1B). For example, as shown in FIG. 1B, the first HMD 24 displays the second video data 50 in response to determining that the second person 42 is associated with a non-HMD. In some implementations, the method 200 includes changing a position of the GUI element (e.g., the card GUI element 28) within the first XR environment based on a movement of the second person and/or the second electronic device within the second environment. For example, the method 200 includes moving the GUI element in the same direction as the second person and/or the second electronic device.

Figure 2C:
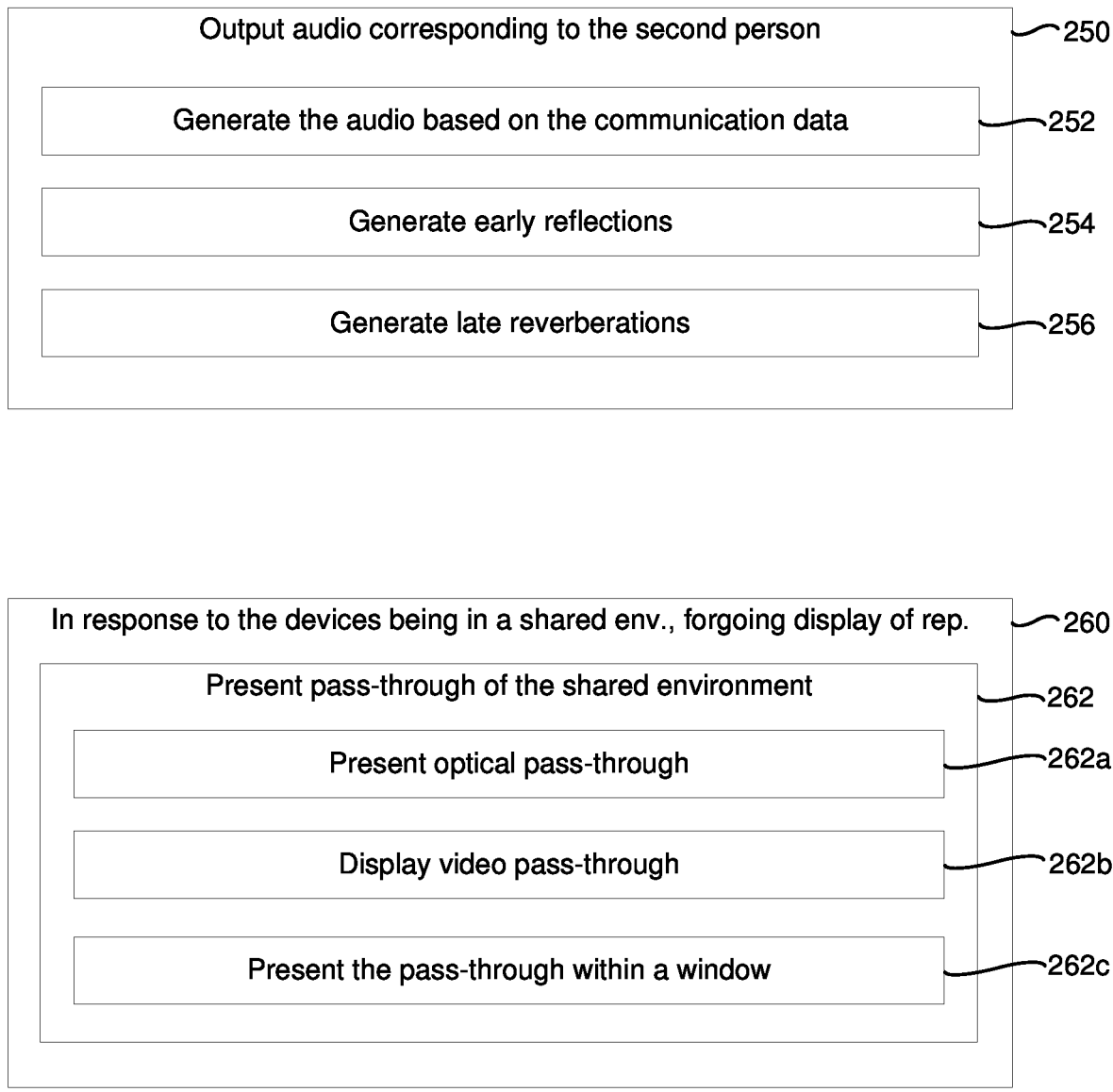

Referring to FIG. 2C, as represented by block 250, in some implementations, the first device includes one or more speakers, and the method 200 includes outputting, via the one or more speakers, audio corresponding to the second person. In some implementations, the audio is spatialized in order to provide an appearance that the audio is originating from the XR representation of the second person. For example, as described in relation to FIG. 1B, the first HMD 24 spatializes the second audio data 48 in order to provide an appearance that the second audio data 48 is originating from the card GUI element 28. Similarly, as described in relation to FIG. 1C, the first HMD 24 spatializes the second audio data 48 in order to provide an appearance that the second audio data 48 is originating from the XR object 30 representing the second person 42.

As represented by block 252, in some implementations, the method 200 includes generating the audio based on the communication data associated with the second device. For example, as shown in FIG. 1A, the first electronic device 14 extracts the second audio data 48 from the second communication data 46. In some implementations, the method 200 includes decoding the communication data in order to identify the audio (e.g., the first electronic device 14 decodes the second communication data 46 in order to identify the second audio data 48).

As represented by block 254, in some implementations, the method 200 includes generating early reflections in order to provide an appearance that the audio is reflecting off surfaces. For example, the first HMD 24 generates early reflections for the second audio data 48 in order to provide an appearance that sounds corresponding to the second audio data 48 are reflecting off surfaces of the first environment 10. In some implementations, the method 200 includes outputting the early reflections before outputting the audio (e.g., the first HMD 24 outputs the early reflections before playing the second audio data 48). In some implementations, the method 200 includes concurrently outputting the early reflections and the audio (e.g., the first HMD 24 concurrently plays the early reflections of the second audio data 48 and the second audio data 48). In some implementations, the method 200 includes generating the early reflections based on a type of the first environment. In some implementations, the first environment is a physical setting and the early reflections provide an appearance that the audio is reflecting off physical surfaces of the physical setting. In some implementations, the first environment is an XR environment (e.g., a virtual environment), and the early reflections provide an appearance that the audio is reflecting off XR surfaces (e.g., virtual surfaces) of the XR environment.

As represented by block 256, in some implementations, the method 200 includes generating late reverberations in order to provide an appearance that the audio has an echo. For example, the first HMD 24 generates late reverberations for the second audio data 48 in order to provide an appearance that sounds corresponding to the second audio data 48 are echoing in the first environment 10. In some implementations, the method 200 includes outputting the late reverberations after outputting the audio (e.g., the first HMD 24 outputs the later reverberations after playing the second audio data 48). In some implementations, the method 200 includes generating the late reverberations based on a type of the first environment. In some implementations, the first environment is a physical setting and the late reverberations provide an appearance that the audio is echoing in the physical setting. In some implementations, the first environment is an XR environment (e.g., a virtual environment), and the early reflections provide an appearance that the audio is reflecting off XR surfaces (e.g., virtual surfaces) of the XR environment.

As represented by block 260, in some implementations, the method 200 includes in response to determining that the first device and the second device are in a shared environment, forgoing display of the XR representation of the second person. In some implementations, the method 200 includes forgoing display of video data included in the communication data associated with the second device. For example, as shown in FIG. 1D, the first electronic device 14 forgoes displaying the second video data 50 in response to determining that the second electronic device 44 is in the same environment as the first electronic device 14. Similarly, as shown in FIG. 1E, the first HMD 24 forgoes displaying the second video data 50 in response to determining that the second electronic device 44 is in the same environment as the first electronic device 14. In some implementations, the method 200 includes forgoing display of an XR representation of the second person that is generated based on the communication data associated with the second person (e.g., forgo displaying an avatar of the second person when the second person is local). For example, as shown in FIG. 1F, the first HMD 24 forgoes displaying the XR object 30 representing the second person in response to determining that the second HMD 54 is in the same environment as the first HMD 24.

As represented by block 262, in some implementations, the method 200 includes presenting a pass-through of the shared environment. For example, as shown in FIGS. 1E-1F, the first HMD 24 presents the first pass-through 84 of the first environment 10. As represented by block 262a, in some implementations, the method 200 includes presenting an optical pass-through of the shared environment. For example, as described in relation to FIGS. 1E-1F, in some implementations, the first pass-through 84 includes an optical pass-through. As represented by block 262b, in some implementations, the method 200 includes displaying a video pass-through of the shared environment. For example, displaying the first video pass-through 74 shown in FIG. 1D. For example, as described in relation to FIGS. 1E-1F, in some implementations, the first pass-through 84 includes a video pass-through. As represented by block 262c, in some implementations, the method 200 includes displaying a window and presenting the pass-through within the window. For example, as shown in FIGS. 1E-1F, the first pass-through 84 is shown within a card GUI element that is similar to the card GUI element 28 shown in FIG. 1B.

Figure 2D:
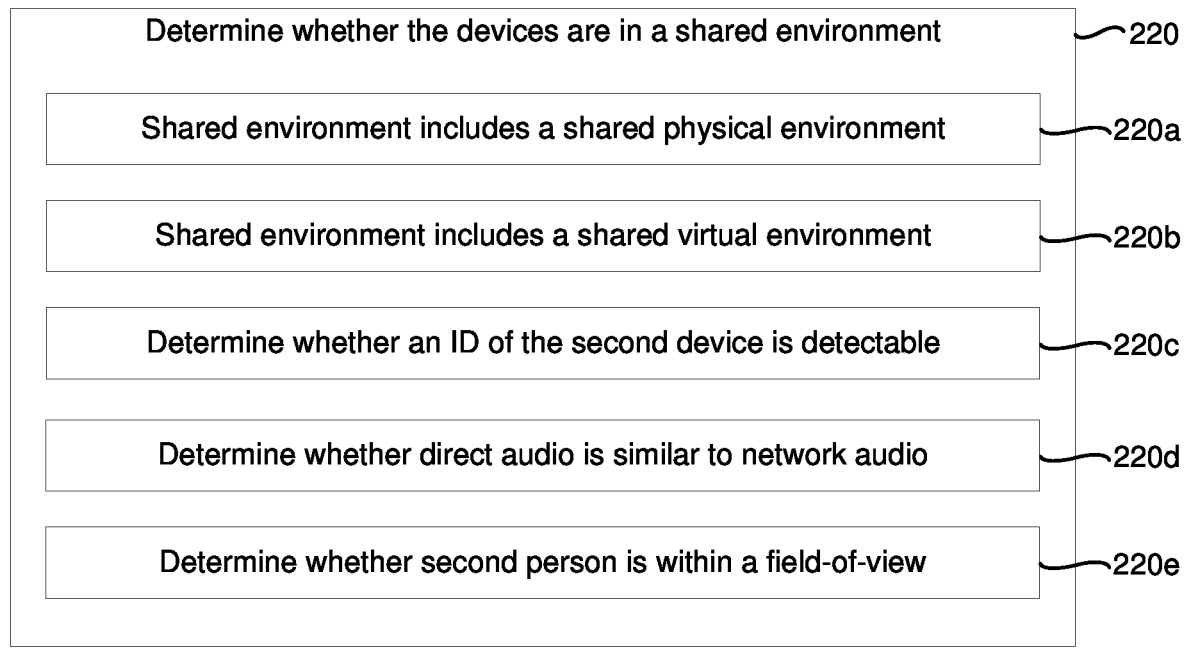

Referring to FIG. 2D, as represented by block 220a, in some implementations, the shared environment includes a shared physical setting. For example, as described in relation to FIG. 1A, in some implementations, the first environment 10 includes a first physical setting. As represented by block 220b, in some implementations, the shared environment includes a shared XR environment. For example, as described in relation to FIG. 1A, in some implementations, the first environment 10 includes a first XR environment.

As represented by block 220c, in some implementations, determining whether the first device and the second device are in the shared environment includes determining whether an identifier (ID) associated with the second device is detectable via short-range communications. Example short-range communications include Bluetooth, Wi-Fi, Near Field Communications (NFC), ZigBee, or the like. For example, in relation to FIG. 1A, the first electronic device 14 determines whether the first electronic device 14 can detect an ID associated with the second electronic device 44. In the example of FIG. 1A, the first electronic device 14 does not detect an ID associated with the second electronic device 44 via short-range communications. Hence, the first electronic device 14 determines that the second electronic device 44 is remote. As another example, in relation to FIG. 1C, in some implementations, the first HMD 24 determines that the second HMD 54 is remote because the first HMD 24 is unable to detect an ID of the second HMD 54 via short-range communications. As yet another example, in relation to FIG. 1F, the first HMD 24 determines that the second HMD 54 is local because the first HMD 24 detects an ID of the second HMD 54 via short-range communications.

As represented by block 220d, in some implementations, determining whether the first device and the second device are in the shared environment includes determining whether audio received via a microphone of the first device is within a degree of similarity of audio encoded in the communication data associated with the second device. For example, in some implementations, the method 200 includes determining whether direct audio from the second person is within a degree of similarity to network audio associated with the second device. As an example, in relation to FIG. 1D, in some implementations, the first electronic device 14 determines that the second electronic device 44 is local because speech 80 of the second person 42 is within a degree of similarity to the second audio data 48 encoded in the second communication data 46.

As represented by block 220e, in some implementations, determining whether the first device and the second device are in the shared environment includes determining based on an image captured via an image sensor of the first device whether the second person is in the shared environment. As an example, in relation to FIG. 1D, in some implementations, the first electronic device 14 captures an image corresponding to the first field-of-view 72, and performs facial detection/recognition on the image to determine whether the second person 42 is in the first environment 10. Since the second person 42 is in the first field-of-view 72, after performing facial detection/recognition on the image, the first electronic device 14 determines that the second person 42 is local.

Figure 3A:
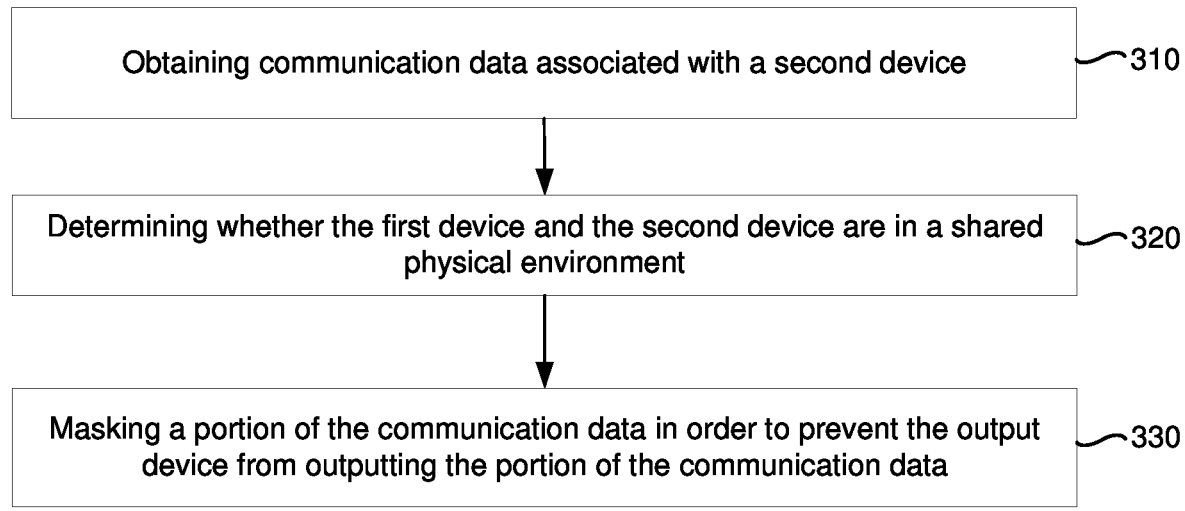
FIGS. 3A-3C are flowchart representations of a method of masking communication data in accordance with some implementations.

FIG. 3A is a flowchart representation of a method 300 of masking communication data. In various implementations, the method 300 is performed by a first device including an output device, a non-transitory memory and one or more processors coupled with the output device and the non-transitory memory. In some implementations, the method 300 is performed by the first electronic device 14, the second electronic device 44, the first HMD 24 and/or the second HMD 54. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes, while the first device is in a communication session with a second device, obtaining communication data associated with (e.g., originating from or generated by) the second device. For example, as shown in FIG. 1D, the first electronic device 14 obtains the second communication data 46 associated with the second electronic device 44. In some implementations, the method 300 includes receiving the communication data over a network. In some implementations, the communication data includes audio data (e.g., network audio, for example, the second audio data 48 shown in FIGS. 1A-1F). In some implementations, the communication data includes video data (e.g., the second video data 50 shown in FIGS. 1A-1F). In some implementations, the communication data includes environmental data (e.g., the second environmental data 52 shown in FIG. 1C). In some implementations, the communication data (e.g., the video data and/or the environmental data) encodes an XR object (e.g., an avatar) representing the second person.

As represented by block 320, in various implementations, the method 300 includes determining that the first device and the second device are in a shared environment. In some implementations, the method 300 includes determining, by the first device, that the second device is in the same environment as the first device. For example, in relation to FIG. 1D, the first electronic device 14 determines that the second electronic device 44 is in the first environment 10. In some implementations, the method 300 includes determining, by the first device, that the second device is local.

As represented by block 330, in various implementations, the method 300 includes masking a portion of the communication data in order to prevent the output device from outputting the portion of the communication data. In some implementations, masking the portion of the communication data includes foregoing presentation of the portion of the communication data. For example, in relation to FIG. 1D, the first electronic device 14 forgoes the presentation of the second communication data 46 in response to determining that the second electronic device 44 is local. In various implementations, masking a portion of the communication data when the second device is local enhances a user experience of the first device by allowing the first person to hear and/or see the second person directly without latency associated with network communications.

Figure 3B:
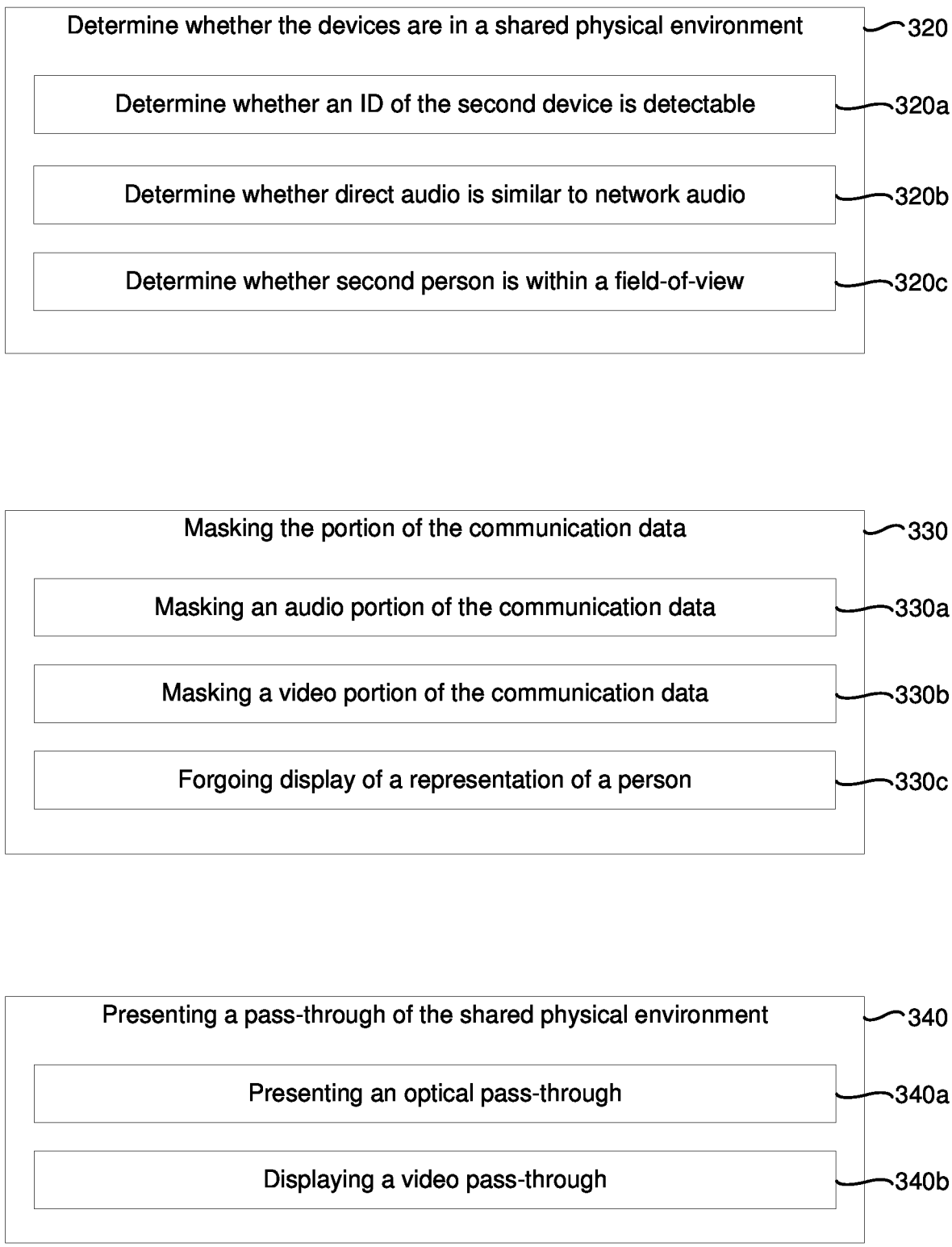

Referring to FIG. 3B, as represented by block 320a, in some implementations, determining whether the first device and the second device are in the shared physical setting includes detecting an identifier associated with the second device via short-range communications. Example short-range communications include Bluetooth, Wi-Fi, Near Field Communications (NFC), ZigBee, or the like. For example, in relation to FIG. 1D, in some implementations, the first electronic device 14 determines that the second electronic device 44 is local in response to detecting an ID associated with the second electronic device 44 via short-range communications. As another example, in relation to FIG. 1F, in some implementations, the first HMD 24 determines that the second HMD 54 is local in response to detecting an ID of the second HMD 54 via short-range communications.

As represented by block 320*b*, in some implementations, determining that the first device and the second device are in the shared physical setting includes detecting, via a microphone of the first device, first audio that is within a degree of similarity to (e.g., within a similarity threshold of) second audio encoded in the communication data. In some implementations, the method 300 includes determining that the second device is local in response to detecting direct audio that is within a degree of similarity to network audio encoded in the communication data. For example, in relation to FIG. 1E, in some implementations, the first HMD 24 determines that the second electronic device 44 is local in response to detecting the speech 80, via a microphone of the first HMD 24, and determining that the speech 80 is within a degree of similarity to the second audio data 48 encoded in the second communication data 46.

As represented by block 320*c*, in some implementations, determining that the first device and the second device are in the shared physical setting includes detecting, via an image sensor of the first device, a person associated with the second device. As an example, in relation to FIG. 1D, in some implementations, the first electronic device 14 captures an image corresponding to the first field-of-view 72, and performs facial detection/recognition on the image to determine whether the second person 42 is in the first environment 10. Since the second person 42 is in the first field-of-view 72, after performing facial detection/recognition on the image, the first electronic device 14 determines that the second electronic device 44 is local.

As represented by block 330*a*, in some implementations, the output device includes a speaker, and masking the portion of the communication data includes masking an audio portion of the communication data in order to prevent the speaker from playing the audio portion of the communication data. As described in relation to FIG. 1D, in some implementations, the first electronic device 14 masks the second audio data 48 in order to prevent a speaker of the first electronic device 14 from playing the second audio data 48. As described herein, forgoing playing the second audio data 48 at the first electronic device 14 enhances a user experience of the first electronic device 14 by allowing the first person 12 to hear the speech 80 being uttered by the second person 42 without interference from the second audio data 48.

As represented by block 330*b*, in some implementations, the output device includes a display, and masking the portion of the communication data includes masking a video portion of the communication data in order to prevent the display from displaying the video portion of the communication data. As described in relation to FIG. 1E, in some implementations, the first HMD 24 masks the second video data 50 in order to prevent a display of the first HMD 24 from displaying the second video data 50. As described herein, forgoing the display of the second video data 50 at the first HMD 24 enhances a user experience of the first HMD 24 by not letting the first person 12 to get distracted by the second video data 50 and allowing the first person 12 to see the first pass-through 84 of the first environment 10.

As represented by block 330*c*, in some implementations, the communication data encodes an XR representation of a person associated with the second device, and masking the portion of the communication data includes forgoing display of the XR representation of the person. For example, as described in relation to FIG. 1F, in some implementations, the first HMD 24 forgoes displaying the XR object 30 representing the second person 42 in response to determining that the second person 42 is in the same environment as the first HMD 24. As described herein, forgoing the display of the XR object 30 at the first HMD 24 enhances a user experience of the first HMD 24 by allowing the first person 12 to see the first pass-through 84 which is associated with a lower latency than generating and displaying the XR object 30.

As represented by block 340, in some implementations, the method 300 includes presenting a pass-through of the shared physical setting. For example, as shown in FIGS. 1E-1F, the first HMD 24 presents the first pass-through 84 of the first environment 10. As represented by block 340*a*, in some implementations, presenting the pass-through includes presenting an optical pass-through of the shared physical setting. For example, as described in relation to FIGS. 1E-1F, in some implementations, the first pass-through 84 includes an optical pass-through in which the first HMD 24 allows light from the first environment 10 to reach eyes of the first person 12. As represented by block 340*b*, in some implementations, presenting the pass-through includes displaying a video pass-through of the shared physical setting. For example, as described in relation to FIGS. 1E-1F, in some implementations, the first pass-through 84 includes a video pass-through in which a display of the first HMD 24 displays a video stream corresponding to the first field-of-detection 82.

Figure 3C:
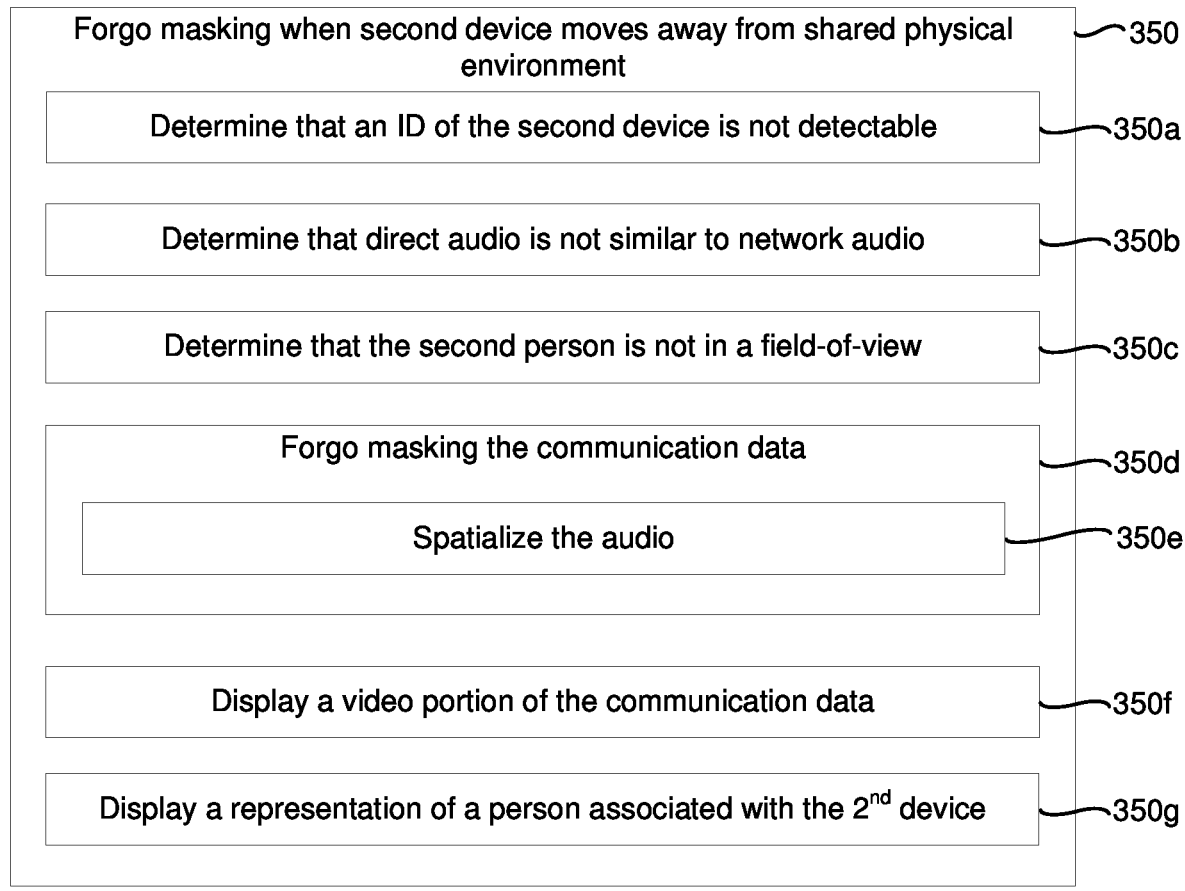

Referring to FIG. 3C, as represented by block 350, in some implementations, the method 300 includes detecting a movement of the second device away from the shared physical setting, and forgoing masking the portion of the communication data in order to allow the output device to output the portion of the communication data. For example, in some implementations, the first electronic device 14 detects that the second electronic device 44 has left the first environment 10, and the first electronic device 14 forgoes masking the second communication data 46 in response to detecting that the second electronic device 44 has left the first environment 10.

As represented by block 350*a*, in some implementations, detecting the movement of the second device away from the shared physical setting includes determining that an identifier associated with the second device is not detectable via short-range communications. For example, in some implementations, the first electronic device 14 and/or the first HMD 24 determine that an ID associated with the second electronic device 44 and/or the second HMD 54 is not detectable via short-range communications.

As represented by block 350*b*, in some implementations, detecting the movement of the second device away from the shared physical setting includes determining that a first audio, detected via a microphone of the first device, is not within a degree of similarity to a second audio encoded in the communication data. For example, in some implementations, the first electronic device 14 and/or the first HMD 24 determine that audio, detected via a microphone of the first electronic device 14 and/or the first HMD 24, does not match the second audio data 48.

As represented by block 350c, in some implementations, detecting the movement of the second device away from the shared physical setting includes determining that environmental data captured by an environmental sensor of the first device indicates that a person associated with the second device has moved away from the shared physical setting. For example, in some implementations, the first electronic device 14 and/or the first HMD 24 determine that environmental data captured by an environmental sensor of the first electronic device 14 and/or the first HMD 24 (e.g., images captured by a camera and/or depth data captured by a depth sensor) indicates that the second person 42 is not in the first environment 10.

As represented by block 350d, in some implementations, the output device includes a speaker, and forgoing masking the portion of the communication data includes outputting an audio portion of the communication data via the speaker. For example, the first electronic device 14 and/or the first HMD 24 output the second audio data 48 in response to determining that the second electronic device 44 and/or the second HMD 54 have left the first environment 10.

As represented by block 350e, in some implementations, outputting the audio portion includes spatializing the audio portion in order to provide an appearance that the audio portion is originating from an XR representation of a person associated with the second device. For example, as described in relation to FIGS. 1B-1C, the first electronic device 14 and/or the first HMD 24 spatialize the second audio data 48 in order to provide an appearance that the second audio data 48 is originating from the card GUI element 28 or the XR object 30 representing the second person 42.

As represented by block 350f, in some implementations, the output device includes a display, and wherein forgoing masking the portion of the communication data includes displaying a video portion of the communication data on the display. For example, in some implementations, the first electronic device 14 and/or the first HMD 24 display the second video data 50 in response to detecting that the second electronic device 44 has left the first environment 10.

As represented by block 350g, in some implementations, the communication data encodes an XR representation of a person associated with the second device, and forgoing masking the portion of the communication data includes displaying the XR representation of the person. For example, in some implementations, the first HMD 24 displays the XR object 30 representing the second person 42 in response to detecting that the second HMD 54 has left the first environment 10.

Figure 4:
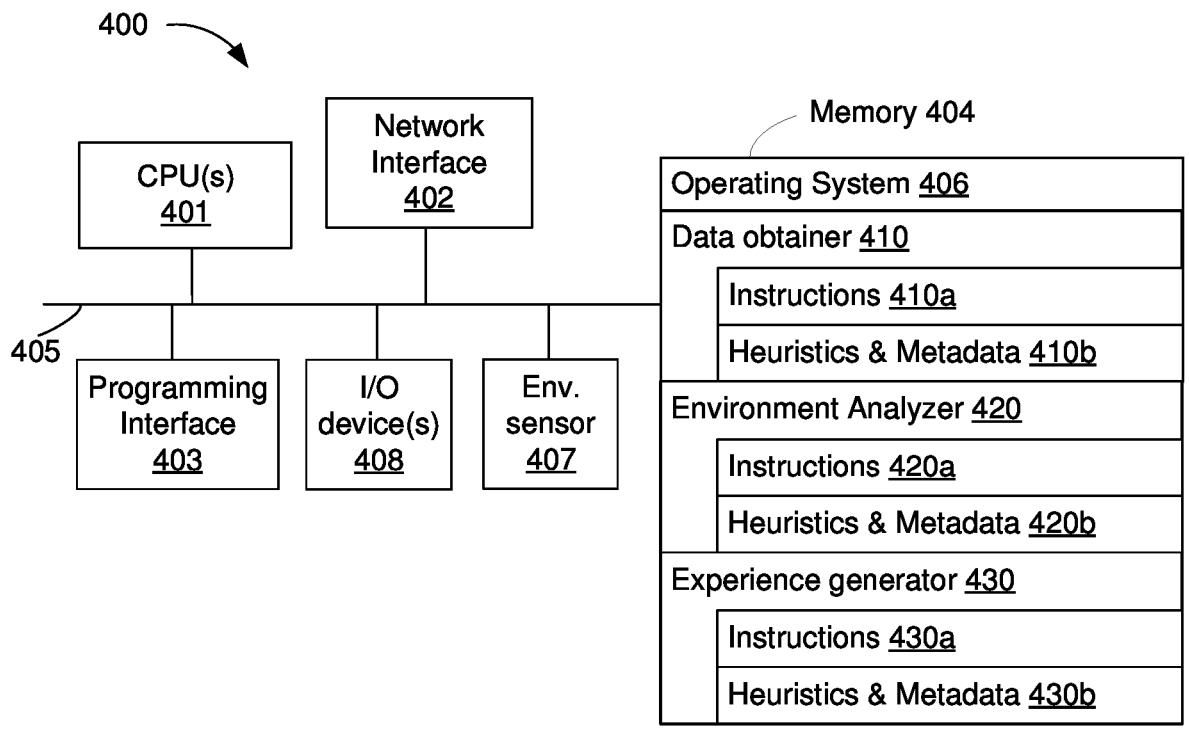
FIG. 4 is a block diagram of a device that presents communication data in accordance with some implementations.

FIG. 4 is a block diagram of a device 400 that presents/masks communication data in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, an environmental sensor 407, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In various implementations, the environmental sensor 407 includes an image sensor. For example, in some implementations, the environmental sensor 407 includes a camera (e.g., a scene-facing camera, an outward-facing camera or a rear-facing camera). In some implementations, the environmental sensor 407 includes a depth sensor. For example, in some implementations, the environmental sensor 407 includes a depth camera.

In some implementations, the memory 404 or the non-transitory computer readable storage medium of the memory 404 stores the following programs, modules and data structures, or a subset thereof including an optional operating system 406, a data obtainer 410, an environment analyzer 420, and an XR experience generator 430. In various implementations, the device 400 performs the method 200 shown in FIGS. 2A-2D. In various implementations, the device 400 performs the method 300 shown in FIGS. 3A-3C. In various implementations, the device 400 implements the first electronic device 14, the second electronic device 44, the first HMD 24, the second HMD 54, the third electronic device 94 and/or the third HMD 104.

In some implementations, the data obtainer 410 obtains data. In some implementations, the data obtainer 410 obtains communication data associated with another device (e.g., the second communication data 46 shown in FIGS. 1A-1F). In some implementations, the data obtainer 410 performs at least a portion of the method 200. For example, in some implementations, the data obtainer 410 performs the operations represented by block 210 shown in FIG. 2A. In some implementations, the data obtainer 410 performs at least a portion of the method 300. For example, in some implementations, the data obtainer 410 performs the operation(s) represented by block 310 shown in FIG. 3A. To that end, the data obtainer 410 includes instructions 410a, and heuristics and metadata 410b.

As described herein, in some implementations, the environment analyzer 420 determines whether or not the device 400 and another device are in a shared environment. For example, the environment analyzer 420 determines whether or not the first electronic device 14 and the second electronic device 44 are in the first environment 10. In some implementations, the environment analyzer 420 performs at least a portion of the method 200. For example, in some implementations, the environment analyzer 420 performs the operation(s) represented by block 220 in FIGS. 2A and 2D. In some implementations, the environment analyzer 420 performs at least a portion of the method 300. For example, in some implementations, the environment analyzer 420 performs the operations(s) represented by block 320 in FIGS. 3A and 3B. To that end, the environment analyzer 420 includes instructions 420a, and heuristics and metadata 420b.

In some implementations, the XR experience generator 430 displays an XR representation of a person associated with the other device in response to the environment analyzer 420 determining that the other device is remote (e.g., not in the same environment as the device 400). In some implementations, the XR experience generator 430 performs at least a portion of the method 200. For example, in some implementations, the XR experience generator 430 performs the operation(s) represented by blocks 230, 240, 250, and 260 in FIGS. 2A-2C. In some implementations, the XR experience generator 430 masks a portion of the communication data in response to the environment analyzer 420 determining that the other device is local (e.g., in the same environment as the device 400). In some implementations, the XR experience generator 430 performs at least a portion of the method 300. For example, in some implementations, the XR experience generator 430 performs the operation(s) represented by blocks 330, 340 and 350 shown in FIGS. 3A-3C. To that end, the XR experience generator 430 includes instructions 430a, and heuristics and metadata 430b.

In some implementations, the one or more I/O devices 408 include one or more sensors for capturing environmental data associated with an environment (e.g., the first environment 10 shown in FIGS. 1A-1G. For example, in some implementations, the one or more I/O devices 408 include an image sensor (e.g., a camera), an ambient light sensor (ALS), a microphone and/or a location sensor. In some implementations, the one or more I/O devices 408 include a display (e.g., an opaque display or an optical see-through display), and/or a speaker for presenting communication data.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a first device associated with a first person, the first device including a display, a non-transitory memory, and one or more processors coupled with the display and the non-transitory memory:
obtaining communication data associated with a second device corresponding to a second person;
determining whether the first device and the second device are in a shared environment;
in response to determining that the first device and the second device are not in a shared environment, displaying a virtual representation of the second person based on the communication data associated with the second device; and
in response to determining that the first device and the second device are in a shared environment, forgo outputting at least an audio portion of the communication data associated with the second device.

2. The method of claim 1, further comprising:
determining a device type of the second device, and
generating the virtual representation of the second person based on the device type.

3. The method of claim 2, further comprising:
in response to the device type being a first device type, generating a first type of the virtual representation of the second person based on the communication data associated with the second device.

4. The method of claim 3, wherein generating the first type of the virtual representation of the second person includes generating a three-dimensional (3D) virtual object that represents the second person.

5. The method of claim 3, wherein the first device type includes a head-mountable device (HMD).

6. The method of claim 2, further comprising:
in response to the device type being a second device type, generating a second type of the virtual representation of the second person based on the communication data associated with the second device.

7. The method of claim 6, wherein generating the second type of the virtual representation of the second person includes generating a two-dimensional (2D) virtual object that represents the second person.

8. The method of claim 6, wherein the second type of the virtual representation includes a video of the second person, wherein the video is encoded in the communication data associated with the second device.

9. The method of claim 6, wherein the second device type includes a handheld device.

10. The method of claim 6, wherein the second device type includes a device that is not a head-mountable device.

11. The method of claim 6, further comprising:
displaying the second type of the virtual representation of the second person within a graphical user interface (GUI) element that is shaped as a card.

12. The method of claim 1, wherein the first device includes one or more speakers, and the method further comprises:
in response to determining that the first device and the second device are not in a shared environment, outputting, via the one or more speakers, audio corresponding to the second person, wherein the audio is spatialized in order to provide an appearance that the audio is originating from the virtual representation of the second person.

13. The method of claim 12, further comprising generating the audio based on the communication data associated with the second device.

14. The method of claim 12, further comprising generating early reflections in order to provide an appearance that the audio is reflecting off surfaces.

15. The method of claim 12, further comprising generating late reverberations in order to provide an appearance that the audio includes multiple sound reflections.

16. The method of claim 1, further comprising:
in response to determining that the first device and the second device are in a shared environment, forgoing display of the virtual representation of the second person.

17. The method of claim 16, further comprising:
presenting a pass-through of the shared environment.

18. The method of claim 17, wherein presenting the pass-through includes presenting an optical pass-through of the shared environment.

19. A first device comprising:
one or more processors;
a display;
a non-transitory memory; and
one or more programs stored in the non-transitory memory, which, when executed by the one or more processors, cause the first device to:
obtain communication data associated with a second device corresponding to a second person;
determine whether the first device and the second device are in a shared environment;
in response to determining that the first device and the second device are not in a shared environment, display a virtual representation of the second person based on the communication data associated with the second device; and
in response to determining that the first device and the second device are in a shared environment, forgo outputting at least an audio portion of the communication data associated with the second device.

20. A non-transitory memory storing one or more programs, which, when executed by one or more processors of a first device with a display, cause the first device to:
obtain communication data associated with a second device corresponding to a second person;
determine whether the first device and the second device are in a shared environment;
in response to determining that the first device and the second device are not in a shared environment, display a virtual representation of the second person based on the communication data associated with the second device; and
in response to determining that the first device and the second device are in a shared environment, forgo outputting at least an audio portion of the communication data associated with the second device.

* * * * *